United States Patent
Ueno et al.

[11] Patent Number: 6,106,590
[45] Date of Patent: Aug. 22, 2000

[54] METHOD OF ULTRASONIC WAVES DEGASSING AND DEVICE USING THE SAME

[75] Inventors: Nobuhiro Ueno; Yasuo Nishi, both of Hino; Takeshi Sakurai, Odawara, all of Japan

[73] Assignee: Konica Corporation, Japan

[21] Appl. No.: 09/098,148

[22] Filed: Jun. 16, 1998

[30] Foreign Application Priority Data

Jun. 17, 1997 [JP] Japan ................................ 9-159864
Sep. 16, 1997 [JP] Japan ................................ 9-250695

[51] Int. Cl.⁷ ................................................ B01D 19/00
[52] U.S. Cl. ...................... 95/30; 95/242; 95/266; 96/175; 96/180; 96/193
[58] Field of Search ............... 95/29, 30, 242, 95/243, 247, 266; 96/175, 176, 180, 193

[56] References Cited

U.S. PATENT DOCUMENTS

| | | | |
|---|---|---|---|
| 2,620,894 | 12/1952 | Peterson et al. | 95/30 |
| 3,761,732 | 9/1973 | Ratcliff | 96/175 X |
| 3,853,500 | 12/1974 | Gasmann et al. | 96/175 X |
| 3,904,392 | 9/1975 | VanIngen et al. | 95/30 |
| 4,205,966 | 6/1980 | Horikawa | 55/15 |
| 4,612,018 | 9/1986 | Tsuboi et al. | 55/15 |
| 5,509,954 | 4/1996 | Derian et al. | 95/266 X |

FOREIGN PATENT DOCUMENTS

| | | | |
|---|---|---|---|
| 57-006365 | 2/1982 | Japan | 96/175 |
| 3-157103 | 7/1991 | Japan | 95/30 |
| 3-193106 | 8/1991 | Japan | 95/30 |

OTHER PUBLICATIONS

European Search Report EP 98 11 0986.
European Patent Office—Patent Abstracts of Japan Publication # 59092003, Publication Date May 28, 1984. Publication # 07080207, Publication Date. Mar. 28, 1995.

*Primary Examiner*—Robert H. Spitzer
*Attorney, Agent, or Firm*—Jordan B. Bierman; Bierman, Muserlian and Lucas

[57] ABSTRACT

In an apparatus for defoaming liquid with ultrasonic wave in order to eliminate foam or bubble from the liquid, provided with an ultrasonic wave liquid tank, a defoaming tank, and an ultrasonic oscillator for irradiating ultrasonic wave through the ultrasonic wave transmitting liquid to the defoaming tank; at least a part of the defoaming tank is immersed in the ultrasonic wave transmitting liquid in the ultrasonic wave liquid tank, and a degree of unsaturation of dissolved air in the ultrasonic wave transmitting liquid under defoaming operation is not lower than 10%.

27 Claims, 12 Drawing Sheets

METHOD OF ULTRASONIC WAVES DEGASSING AND DEVICE USING THE SAME

BACKGROUND OF THE INVENTION

The present invention relates to a method of degassing or defoaming a liquid with ultrasonic waves, wherein the liquid containing bubble or foam is irradiated with ultrasonic waves in order to eliminate bubble or foam from the liquid, a device using the same and a method of manufacturing a light-sensitive material using the same.

Ordinarily, it is necessary for a certain liquid to be subjected to defoaming.

For example, if a light-sensitive emulsion for light-sensitive photographic film is coated onto a base while bubbles are contained therein, the bubbles cause coating problems. It is, therefore, impossible to form a uniform light-sensitive layer. Streak-shaped or dot-shaped portions which are not sensitive to light at all or where sensitivity is not uniform occurs. Subsequently, it is necessary to defoam the light-sensitive emulsion prior to coating.

As a method of defoaming high viscosity liquids such as a light-sensitive emulsion, a method to defoam the light-sensitive emulsion which is liquid to be defoamed by irradiating it with ultrasonic waves.

In order to enhance the degree of defoaming, various inventions have been made with regard to the form of the defoaming tank which houses a liquid to be defoamed and the strength and direction of the ultrasonic waves. However, no inventions have been able to complete defoaming of the liquid to be defoamed. Further improvement in defoaming effectiveness is demanded.

In addition, recently, photographic coating liquids such as light-sensitive emulsions tend to be condensed, leading to enhanced viscosity. Accordingly, further improvement of the degree of defoaming is demanded.

After laborious study, the present inventors discovered that the bubble-trap effect (in which bubbles are trapped at node portions of the standing waves which occurs in the liquid to be defoamed in the defoaming tank due to irradiation of the ultrasonic waves), which is one of defoaming factor is noticeably dependent upon the condition of the occurrence of the ultrasonic waves such as the stability of the position of node of the standing waves and the difference of sound pressure between node and anti-node of the standing waves.

In addition, they also discovered that the aforesaid condition of the occurrence of ultrasonic waves is influenced by the degree of unsaturation of the density of dissolved air in the liquid to be defoamed under condition of using.

The present inventors discovered as follows: namely, in order to trap bubbles, outputting of the ultrasonic waves generator, which had used to be considered as important is actually not important. As shown in FIG. 1, the difference of the strength of sound pressure between node and anti-node of standing waves in an actual defoaming container $\Delta I$ [kgf/cm$^2$] and the frequency SF of the ultrasonic waves [kHz] are, however, important. The relatively larger the difference of the strength of sound pressure between node and anti-node of a standing wave which occurs in the liquid to be defoamed in the defoaming container $\Delta I$ [kgf/cm$^2$] is, the larger the force to entrap bubbles so that the degree of defoaming is increased. Strange to say, the lower the frequency of the ultrasonic waves is, the higher the the degree of defoaming is. The present inventors discovered as follows: namely, in order to dissolve bubbles, outputting of the ultrasonic waves generator, which had used to be considered as important is not important. As shown in FIG. 1, the difference of the strength of sound pressure between node and anti-node of a standing wave in actual defoaming container $\Delta I$ [kgf/cm$^2$] and frequency SF of the ultrasonic waves [kHz] are important. The relatively larger the difference of the strength of sound pressure between node and anti-node of a standing wave which occurs in the liquid to be defoamed in the defoaming container $\Delta I$ [kgf/cm$^2$] is, the larger the force to dissolve bubbles so that the degree of defoaming is increased. Strange to say, the lower the frequency of the ultrasonic waves is, the higher the degree of defoaming is.

In addition, the present inventors discovered that distribution of the standing waves and the form of sound pressure surface of the standing waves are important for defoaming.

As described above, ultrasonic waves defoaming is dependent upon the difference of the strength of sound pressure between node and anti-node of a standing wave which occurs in the liquid to be defoamed in the actual defoaming container $\Delta I$ [kgf/cm$^2$]. However, aforesaid the difference of the strength of sound pressure between node and anti-node of a standing wave which occurs in the liquid to be defoamed in the actual defoaming container $\Delta I$ [kgf/cm$^2$] is not dependent upon outputting of the ultrasonic waves generator, as previously considered.

The reason for the above is that, even when output by the ultrasonic waves generator is large, there are many cases when the strength of sound pressure between node and anti-node of a standing wave which occurs in the liquid to be defoamed in the actual defoaming container $\Delta I$ [kgf/cm$^2$] is extremely small. On the contrary, even when output by the ultrasonic waves generator is small, there are cases in which the strength of sound pressure between node and anti-node of a standing waves which occurs in the liquid to be defoamed in the actual defoaming container $\Delta I$ [kgf/cm$^2$] is quite large.

Output by the ultrasonic waves generator means inputted energy to the ultrasonic waves generator. All of the aforesaid energy input is not necessarily vibration output. Secondly, sound pressure of the ultrasonic waves is determined in proportion to the root of the vibration output. However, the aforesaid vibration output is reduced in conversion to heat or vibration in the liquid for transferring ultrasonic waves housed in the container for liquid for transferring aforesaid ultrasonic waves. In other words, there is ultrasonic waves loss. Thirdly, even if the sound pressure of the ultrasonic waves is the same, depending upon the form, size, location and the position of liquid surface of the ultrasonic waves generator, the container for liquid for transferring ultrasonic waves and the defoaming container, the strength of sound pressure between node and anti-node of a standing wave which occurs in the liquid to be defoamed in the actual defoaming container $\Delta I$ [kgf/cm$^2$] becomes noticeably changed. Due to the above-mentioned factors, the strength of sound pressure between node and anti-node of a standing wave which occurs in the liquid to be defoamed housed in the actual defoaming container $\Delta I$ [kgf/cm$^2$] is not dependent upon output by the ultrasonic waves generator, as has been considered.

Next, the reason for the noticeable change, even if the sound pressure of the ultrasonic waves is the same, depending upon the form, size, location and the position of liquid surface of the ultrasonic waves generator, the container for liquid for transferring ultrasonic waves and the defoaming container, the strength of sound pressure between node and anti-node of a standing wave which occurs in the liquid to be defoamed in the actual defoaming container $\Delta I$ [kgf/cm$^2$] will be explained.

Due to ultrasonic waves having the same frequency but transferred to different directions, a standing wave occurs. An actual standing wave in the defoaming container occurs between the ultrasonic wave directly transferred from the ultrasonic waves generator and the ultrasonic waves reflected from the wall of the container. It is normal that the strength and the direction of the reflected ultrasonic waves are different depending upon the form, size, location and the position of the liquid surface of the ultrasonic waves generator, the container for liquid for transferring ultrasonic waves and the defoaming container. Due to this, distribution of the standing waves and the form of the sound pressure surface of the standing waves noticeably influence, the degree of defoaming.

Ordinarily, the strength of sound pressure between node and anti-node of a standing wave $\Delta I$ [kgf/cm$^2$] is small. Average sound pressure strength IM [kgf/cm$^2$] is larger than $\Delta I$ [kgf/cm$^2$] is small. The contrary condition thereof ($\Delta I > 2 \times$ IM) cannot be considered. Dissolution of bubbles leaked from the trapped position of the bubbles is also an important factor. Force of the flowing out bubbles is also an important factor. The present inventors attained an invention detailed in the following items, considering the above-mentioned related factors.

Incidentally, in the force of the flowing-out bubbles, viscosity CV [cp], of the liquid to be defoamed, and flow rate FR [mm/sec.], of the defoamed liquid, are important factors. In dissolution of the bubbles, the strength of sound pressure between node and anti-node of a standing wave $\Delta I$ [kgf/Cm$^2$], frequency of ultrasonic waves [kHz] and the degree of air unsaturation of the above-mentioned liquid to be defoamed AS [%].

SUMMARY OF THE INVENTION

The present invention was attained viewing the above-mentioned situation.

The present invention pays attention to the degree of unsaturation of the density of dissolved air in the liquid for transferring ultrasonic waves, as a primary medium, to which nobody has paid attention. An object of the present invention is to provide a method of defoaming with ultrasonic wave and a device of ultrasonic waves defoaming capable of enhancing the degree of defoaming without changing the form of the defoaming tank, increasing output of the ultrasonic waves generator, changing position or processing liquid to be defoamed.

Item 1: A method of defoaming a liquid with ultrasonic waves, wherein the liquid containing bubbles or foam is irradiated with ultrasonic waves through a liquid for transferring ultrasonic waves, wherein the degree of unsaturation of the density of dissolved air in the above-mentioned liquid for transferring ultrasonic waves under condition of using is 10% or more.

By setting the degree of unsaturation of the density of dissolved air in the above-mentioned liquid for transferring ultrasonic waves as a primary medium is 10% or more, the degree of defoaming can be enhanced without modifying the form of the defoaming tank, strengthening output of the ultrasonic waves generator, changing position or processing the liquid to be defoamed. Due to an enhanced degree of defoaming, even if output by the ultrasonic waves irradiation is lower than previously, the degree of defoaming of the previous level can be obtained. Thus, energy saving can be attained.

Without noticeably modifying ultrasonic waves defoaming device in which a liquid for transferring ultrasonic waves is used as a primary medium, the present invention can be easily applied. Therefore, a method of defoaming with ultrasonic wave and ultrasonic waves defoaming device which can enhance the degree of defoaming can be provided.

Item 2: The method of defoaming with ultrasonic wave described in Item 1, wherein the degree of unsaturation of the density of dissolved air in the above-mentioned liquid for transferring ultrasonic waves under conditions of pressure and temperature during use is 10% or more, by defoaming the above-mentioned liquid for transferring ultrasonic waves.

Due to a simple structure in which the liquid for transferring ultrasonic waves is also defoamed, the degree of defoaming can be enhanced.

Item 3: The method of defoaming with ultrasonic wave described in either Item 1 or 2, wherein the degree of unsaturation of the density of dissolved air in the above-mentioned liquid for transferring ultrasonic waves in the above-mentioned liquid for transferring ultrasonic waves under conditions of pressure and temperature during use is 10% or more, by pressing the above-mentioned liquid for transferring ultrasonic waves.

Due to a simple structure in which pressure is applied to the liquid for transferring ultrasonic waves, enhancement of the degree of defoaming can be improved.

Item 4: Ultrasonic waves defoaming device wherein defoaming is conducted by a method of defoaming with ultrasonic wave described in either of any Items 1 through 3.

By setting the degree of unsaturation of the density of dissolved air in the above-mentioned liquid for transferring ultrasonic waves as a primary medium is 10% or more, the degree of defoaming can be enhanced without modifying the form of the defoaming tank, strengthening output of the ultrasonic waves generator, changing position or processing the liquid to be defoamed. Due to enhancing the degree of defoaming, even if output by the ultrasonic waves irradiation is lowered compared with previously, the degree of defoaming having the same level as previous can be obtained. Thus, energy saving can be attained.

Without noticeably modifying the ultrasonic waves defoaming device in which liquid for transferring ultrasonic waves was used as a primary medium, the present invention can be easily applied. Therefore, a method of defoaming with ultrasonic wave and ultrasonic waves defoaming device which can enhance the degree of defoaming can be provided.

Item 5: Ultrasonic waves defoaming device containing a liquid for transferring ultrasonic waves inside thereof, having ultrasonic waves liquid tank provided with ultrasonic waves generator and a defoaming tank housing a liquid to be defoamed or a liquid feeding tube which feeds the liquid to be defoamed, in which at least a part of the above-mentioned defoaming tank or the above-mentioned liquid feeding tube are immersed in liquid for transferring ultrasonic waves, wherein the degree of unsaturation of the density of dissolved air in the liquid for transferring ultrasonic waves under condition of using water is set to be 10% or more.

By setting the degree of unsaturation of the density of dissolved air in the above-mentioned liquid for transferring ultrasonic waves as a primary medium is 10% or more, the degree of defoaming can be enhanced without modifying the form of the defoaming tank, strengthening output of the ultrasonic waves generator, changing position or processing the liquid to be defoamed. Due to enhancing the degree of defoaming, even if output by the ultrasonic waves irradiation is lowered compared with previously, the degree of defoaming having the same level as previously can be obtained. Thus, energy saving can be attained.

Without noticeably modifying a conventional ultrasonic waves defoaming device which used to use liquid for transferring ultrasonic waves as a primary medium, it is possible to provide a method of defoaming ultrasonic waves and ultrasonic waves defoaming device which can enhance defoaming effect.

Item 6: The ultrasonic waves defoaming device described in Item 5, wherein a defoaming means setting the degree of unsaturation of the density of dissolved air in the above-mentioned liquid for transferring ultrasonic waves under conditions of pressure and temperature during use to be 10% or more, by defoaming the above-mentioned liquid for transferring ultrasonic waves is provided.

Due to the simple structure to defoam the liquid for transferring ultrasonic waves, the degree of defoaming can be enhanced.

Item 7: The ultrasonic waves defoaming device described in Item 5 or 6, wherein a pressure means sets the degree of unsaturation of the density of dissolved air in the above-mentioned liquid for transferring ultrasonic waves under conditions of pressure and temperature during use to be 10% or more, by defoaming the above-mentioned liquid for transferring ultrasonic waves is provided.

Due to a simple structure to press the liquid for transferring ultrasonic waves, the degree of defoaming can be enhanced.

In the present invention, "under conditions of pressure and temperature during use" is defined to be the conditions of the liquid for transferring ultrasonic waves when the ultrasonic waves are irradiated into the liquid to be defoamed through the liquid for transferring ultrasonic waves. Pressure and temperature are cited.

In the present invention, suppose that "the degree of unsaturation of the density of dissolved air under conditions of pressure and temperature during use" to be P, P can be represented by the following equation:

$$P = (1 - A/B) \times 100 \, (\%)$$

wherein A represents the density of dissolved air in the liquid for transferring ultrasonic waves under conditions of pressure and temperature during use (%) and B represents the density of saturated dissolved air in the liquid for transferring ultrasonic waves under conditions of pressure and temperature during use (%).

As one example of a method of measuring the density of dissolved air in the liquid for transferring ultrasonic waves under conditions of pressure and temperature during use, the density of dissolved air in the liquid for transferring ultrasonic waves under conditions of pressure and temperature during use is measured by means of a dissolved oxygen densitometer, and based on the ratio of oxygen in air under conditions of pressure and temperature during use. From the measurement results of the density of dissolved oxygen in the liquid for transferring ultrasonic waves under conditions of pressure and temperature during use, the density of dissolved air in the liquid for transferring ultrasonic waves under conditions of pressure and temperature during use can be calculated.

The density of dissolved air in the liquid for transferring ultrasonic waves under conditions of pressure and temperature during use can be calculated from using conditions (pressure and temperature).

From the density of dissolved air in the liquid for transferring ultrasonic waves under conditions of pressure and temperature during use and the density of saturated dissolved air in the liquid for transferring ultrasonic waves under conditions of pressure and temperature during use, as measured as above, the degree of unsaturation of the density of dissolved air under conditions of pressure and temperature during use can be calculated.

Item 8: An ultrasonic waves defoaming method which defoams a liquid to be defoamed by irradiating the ultrasonic waves into the above-mentioned liquid to be defoamed in a defoaming container through a liquid for transferring the ultrasonic waves while the above-mentioned liquid to be defoamed is flowed into the above-mentioned defoaming container through a liquid inlet port of the defoaming container to the liquid outlet port of the above-mentioned defoaming container, wherein the liquid to be defoamed is defoamed under a condition that the relationship between the difference of the strength of sound pressure between node and anti-node of a standing wave which occurs in liquid to be defoamed inside the above-mentioned defoaming container $\Delta I$ [kgf/cm$^2$], flow rate of the above-mentioned liquid to be defoamed at the above-mentioned liquid flowing outlet 113 of the above-mentioned defoaming container FR [mm/sec.], the viscosity of the above-mentioned liquid to be defoamed CV [cp], the frequency of the above-mentioned ultrasonic waves SF [kHz] and the degree of air unsaturation of the above-mentioned liquid to be defoamed in the above-mentioned defoaming container AS satisfies the following equation.

Equation (1)

$$\Delta I * AS / (FR * CV * SF) \geq 0.$$

Due to an invention described in Item 8, the degree of defoaming is further improved.

Item 9: The ultrasonic waves defoaming method described in Item 8, wherein the liquid to be defoamed is defoamed under a condition in which at least one node of the standing waves exists between the liquid inlet port of the above-mentioned defoaming container and the above-mentioned defoaming container.

Due to the invention described in Item 9, bubbles can be trapped by means of nodes of the standing waves so that the degree of defoaming is further improved stably.

Item 10: The ultrasonic waves defoaming method described in Item 9, wherein the liquid to be defoamed is defoamed when whether or not it is sensed that at least one sound pressure surface of the standing waves exists between the liquid inlet port of the above-mentioned deforming container and the above-mentioned defoaming container when it is sensed that at least one node of the standing waves exists between the liquid inlet port of the above-mentioned defoaming container.

Due to the invention described in Item 10, defoaming is conducted when it is sensed that the surface of the node of the standing waves exists, bubbles can be trapped more surely by means of nodes of the standing waves. Therefore, the degree of defoaming is more surely enhanced.

If it is sensed that no node of the standing waves exists between the liquid inlet port of the above-mentioned defoaming container, it is preferable to stop out-flow of the liquid.

Item 11: The ultrasonic waves defoaming method described in any of items 8 through 10, wherein also output of the irradiated ultrasonic waves is controlled in such a manner that the above-mentioned equation (1) is satisfied in accordance with the sound pressure measured by a sound pressure measuring means which measures the sound pressure in the above-mentioned defoaming container.

Due to an invention described in Item 11, the degree of defoaming is further improved stably.

Item 12: The ultrasonic waves defoaming method described in any of either items 8 through 11, wherein two ultrasonic waves generators are located in a container for the liquid for transferring ultrasonic waves which houses the liquid for transferring ultrasonic waves as if enclosing the around of the above-mentioned defoaming container in a position having 90° or more against the center of the above-mentioned defoaming container.

Due to the invention described in Item 12, nodes of the standing waves assuredly occur so that bubbles are further trapped. As a result, the degree of defoaming is further enhanced.

In addition, if two ultrasonic waves generators are located symmetrically across the center of the defoaming container, nodes of the standing waves occur more assuredly, which is preferable.

Item 13: The ultrasonic waves defoaming method described in any of items 8 through 12, wherein a container for the liquid for transferring ultrasonic waves housing the liquid for transferring ultrasonic waves is provided as if enclosing around the above-mentioned defoaming container, plural fins or corrugations are provided on the exterior of the above-mentioned liquid for transferring ultrasonic waves in the above-mentioned defoaming container and ultrasonic waves are irradiated through the liquid for transferring ultrasonic waves.

Due to the invention described in Item 13, complex and more numerous nodes of the standing waves occur due to the existence of aforesaid plural fins or corrugations. Therefore, bubbles can further be trapped. The degree of defoaming is still further enhanced.

Item 14: The ultrasonic waves defoaming method described in any of either items 8 through 13, wherein the above-mentioned liquid outlet port is located on the bottom of the above-mentioned defoaming container and the liquid is defoamed while nodes of the standing waves move in the above-mentioned defoaming container toward the liquid's surface.

Due to the invention described in Item 14, nodes of the standing waves in the above-mentioned defoaming container move to the liquid surface direction. Therefore, that bubbles trapped by the nodes of the standing waves are collected excessively, causing defoaming difficultly can be prevented. As a result, the degree of defoaming is further improved stably.

Item 15: The ultrasonic waves defoaming method described in Item 14, wherein ultrasonic waves generators provided plurally in a container for the liquid for transferring ultrasonic waves housing the liquid for transferring ultrasonic waves as if enclosing the around of the above-mentioned defoaming container in such a manner that the liquid is defoamed while nodes of the standing waves in the above-mentioned defoaming container are moved while letting outputting alternatingly.

Due to the invention described in Item 15, nodes of the standing waves in the defoaming container can be moved to the liquid surface due to the physical movement of the ultrasonic waves generator. Due to this, nodes of the standing waves in the above-mentioned defoaming container move toward the liquid surface direction. Therefore, that bubbles trapped by the nodes of the standing waves is collected excessively, causing defoaming difficultly can be prevented. As a result, the degree of defoaming is further improved stably.

Item 16: The ultrasonic waves defoaming method described in Item 14, wherein the vibration frequency of ultrasonic waves generators provided plurally in a container for the liquid for transferring ultrasonic waves housing the liquid for transferring ultrasonic waves as if enclosing the around of the above-mentioned defoaming container in such a manner that the liquid is defoamed while nodes of the standing waves in the above-mentioned defoaming container is demodulated while outputting aforesaid generators alternately.

Due to an invention described in Item 16, nodes of the standing waves in the defoaming container can be moved toward the liquid surface direction due to the demodulation of the vibrating frequency of the ultrasonic waves generator. Due to this, nodes of the standing waves in the above-mentioned defoaming container is moved to the liquid surface direction. Therefore, that bubbles trapped by the nodes of the standing waves is collected excessively, causing defoaming difficultly can be prevented. As a result, the degree of defoaming is further improved stably.

Item 17: A method of manufacturing a light-sensitive material wherein a coating liquid for the light-sensitive material is defoamed by the ultrasonic waves defoaming method described in any of Items 1 through 9 and the light-sensitive material is manufactured by coating coating liquid for the light-sensitive material defoamed onto the support of the light-sensitive materiel.

Due to the invention described in Item 17, the degree of defoaming of the coating liquid for the light-sensitive material is further enhanced. Therefore, uniform light-sensitive layer can be formed and streak-shaped or dot-shaped portions which is not sensitive to light or in which sensitivity is not uniform can effectively be minimized.

Item 18: In an ultrasonic wave defoaming device having a defoaming container having a liquid inlet and a liquid outlet, a means for feeding a liquid to be defoamed which flows the liquid to be defoamed into the above-mentioned defoaming container from the above-mentioned liquid inlet port of the above-mentioned defoaming container to the liquid outlet port of the above-mentioned defoaming container, a container for the liquid for ultrasonic waves housing the liquid for transferring ultrasonic waves as if enclosing around the above-mentioned defoaming container and plural ultrasonic waves generator, which vibrates ultrasonic waves, which is located in the above-mentioned container for the liquid for transferring ultrasonic waves, wherein the above-mentioned liquid to be defoamed is defoamed by irradiating ultrasonic waves, vibrated by the plural of the above-mentioned ultrasonic waves generator while flowing the liquid to be defoamed into the above-mentioned defoaming container from the above-mentioned liquid inlet port of the above-mentioned defoaming container to the liquid outlet port of the above-mentioned defoaming container, onto the above-mentioned liquid to be defoamed in the above-mentioned defoaming container through the above-mentioned liquid for transferring ultrasonic waves housed in the above-mentioned container, ultrasonic waves defoaming device having a sound pressure measuring means which measures sound pressure in the above-mentioned defoaming container, wherein output of the irradiated ultrasonic waves is controlled in such a manner that the above-mentioned equation (1) is satisfied in accordance with the sound pressure measured by a sound pressure measuring means. Equation (1)

$$\Delta I * AS / (FR * CV * SF) \geq 0.0026$$

wherein $\Delta I$ represents the difference of the strength of sound pressure between node and anti-node of a standing wave which occurs in the liquid to be defoamed inside the above-mentioned defoaming container [$kgf/cm^2$], FR represents flow rate of the above-mentioned liquid to be defoamed at the above-mentioned liquid flowing outlet 113 of the above-mentioned defoaming container [mm/sec.], CV represents the viscosity of the above-mentioned liquid to be defoamed [cp]

SF represents frequency of the above-mentioned ultrasonic waves [kHz] and

AS represents the degree of air unsaturation of the above-mentioned liquid to be defoamed in the above-mentioned defoaming container.

Due to the invention described in Item 18, the degree of defoaming is further enhanced stably.

Item 19: The ultrasonic waves defoaming device described in Item 18, wherein whether or not it is sensed that at least one sound pressure surface of the standing waves exists between the liquid inlet port of the above-mentioned defoaming container and the above-mentioned defoaming container and the liquid is defoamed when it is sensed that at least one sound pressure surface of the standing waves exists between the liquid inlet port of the above-mentioned defoaming container and the above-mentioned defoaming container.

Due to the invention described in Item 19, the liquid is defoamed when it is sensed that a node of the standing waves exists. Therefore, bubbles can be trapped by means of nodes of the standing waves more surely and thereby the degree of defoaming is further enhanced more surely.

If it is sensed that no node of a standing wave exists between the liquid inlet port of the above-mentioned defoaming container, it is preferable to prevent out-flow of the liquid.

Item 20: In an ultrasonic waves defoaming device having a defoaming container having a liquid inlet and a liquid outlet, a means for feeding a liquid to be defoamed which flows the liquid to be defoamed into the above-mentioned defoaming container from the above-mentioned liquid inlet port of the above-mentioned defoaming container to the liquid outlet port of the above-mentioned defoaming container, a container for the liquid for ultrasonic waves housing the liquid for transferring ultrasonic waves as if enclosing around the above-mentioned defoaming container and plural ultrasonic waves generator, which vibrates ultrasonic waves, which are located in the above-mentioned container for the liquid for transferring ultrasonic waves, wherein the above-mentioned liquid to be defoamed is defoamed by irradiating ultrasonic waves, vibrated by the plural of the above-mentioned ultrasonic waves generator while flowing the liquid to be defoamed into the above-mentioned defoaming container from the above-mentioned liquid inlet port of the above-mentioned defoaming container to the liquid outlet port of the above-mentioned defoaming container, onto the above-mentioned liquid to be defoamed in the above-mentioned defoaming container through the above-mentioned liquid for transferring ultrasonic waves housed in the above-mentioned container, ultrasonic waves defoaming device wherein plural of the above-mentioned ultrasonic waves generators are located in a position facing each other based on the center of the above-mentioned defoaming container in such a manner that the vibration surface is 90° to the outlet surface.

Due to the invention described in Item 20, nodes of the standing waves assuredly occur so that bubbles can be trapped further. As a result, the degree of defoaming is further enhanced.

Since two ultrasonic waves generators are located symmetrically each other based on the center of the defoaming container, it is preferable that effects in which nodes of the standing waves assuredly occur.

Item 21: In an ultrasonic waves defoaming device having a defoaming container with a liquid inlet and a liquid outlet, a means for feeding a liquid to be defoamed which flows the liquid to be defoamed into the above-mentioned defoaming container from the above-mentioned liquid inlet port of the above-mentioned defoaming container to the liquid outlet port of the above-mentioned defoaming container, a container for the liquid for ultrasonic waves housing the liquid for transferring ultrasonic waves as if enclosing around the above-mentioned defoaming container and plural ultrasonic waves generator, which vibrates ultrasonic waves, which are located in the above-mentioned container for the liquid for transferring ultrasonic waves, wherein the above-mentioned liquid to be defoamed is defoamed by irradiating ultrasonic waves, vibrated by the plural of the above-mentioned ultrasonic waves generator while feeding the liquid to be defoamed into the above-mentioned defoaming container from the above-mentioned liquid inlet port of the above-mentioned defoaming container to the liquid outlet port of the above-mentioned defoaming container, onto the above-mentioned liquid to be defoamed in the above-mentioned defoaming container through the above-mentioned liquid for transferring ultrasonic waves housed in the above-mentioned container, ultrasonic waves defoaming device wherein plural fins or corrugations are provided on the side of the above-mentioned liquid for transferring ultrasonic waves in the above-mentioned defoaming container and ultrasonic waves is irradiated through the liquid for transferring ultrasonic waves.

Due to the invention described in Item 21, numerous and complex nodes of the standing waves occur due to the existence of plural fins or corrugations. Therefore, bubbles can further be trapped. The degree of defoaming is further enhanced.

Item 22: In ultrasonic waves defoaming device having a defoaming container having a liquid inlet and a liquid outlet, a means for feeding a liquid to be defoamed which flows the liquid to be defoamed into the above-mentioned defoaming container from the above-mentioned liquid inlet port of the above-mentioned defoaming container to the liquid outlet port of the above-mentioned defoaming container, a container for the liquid for ultrasonic waves housing the liquid for transferring ultrasonic waves as if enclosing around the above-mentioned defoaming container and plural ultrasonic waves generator, which vibrates ultrasonic waves, which is located in the above-mentioned container for the liquid for transferring ultrasonic waves, wherein the above-mentioned liquid to be defoamed is defoamed by irradiating ultrasonic waves, vibrated by the plural of the above-mentioned ultrasonic waves generator while flowing the liquid to be defoamed into the above-mentioned defoaming container from the above-mentioned liquid inlet port of the above-mentioned defoaming container to the liquid outlet port of the above-mentioned defoaming container, onto the above-mentioned liquid to be defoamed in the above-mentioned defoaming container through the above-mentioned liquid for transferring ultrasonic waves housed in the above-mentioned container, ultrasonic waves defoaming device wherein the above-mentioned liquid outlet port is located on the bottom of the above-mentioned defoaming container, and the liquid is defoamed while moving nodes of the standing waves inside the above-mentioned defoaming container to the liquid surface direction.

Due to the invention described in Item 22, nodes of the standing waves in the above-mentioned defoaming container is moved to the liquid surface direction. Therefore, that bubbles trapped by the nodes of the standing waves is collected excessively, causing defoaming difficultly can be prevented. As a result, the degree of defoaming is further improved stably.

Item 23: The ultrasonic waves defoaming device described in Item 22, wherein at least two ultrasonic waves generator groups composed of at least two ultrasonic waves generators respectively are provided in the above-mentioned container for the liquid for transferring ultrasonic waves, a procedure in which one of the two above-mentioned ultrasonic waves generator groups is moved while outputting and outputting of the other ultrasonic waves generator is prohibited is alternated and, thereby, the liquid is defoamed while moving nodes of the standing waves inside the above-mentioned defoaming container to the liquid surface direction.

Due to the invention described in Item 23, nodes of the standing waves inside the above-mentioned defoaming container can be moved due to the movement of the ultrasonic waves generator group composed of at least two ultrasonic waves generators to the liquid surface direction. Due to this, nodes of the standing waves in the above-mentioned defoaming container are moved toward the liquid surface direction. Therefore, that bubbles trapped by the nodes of the standing waves is collected excessively, causing defoaming difficultly can be prevented. As a result, the degree of defoaming is further improved stably.

Item 24: The ultrasonic waves defoaming device described in Item 23 provided in a container for the liquid for transferring ultrasonic waves which houses the liquid for transferring ultrasonic waves as if enclosing around the above-mentioned defoaming container, wherein the vibration frequency of plural of the above-mentioned ultrasonic waves generator is demodulated in such a manner that the liquid is defoamed while moving nodes of the standing waves in the above-mentioned defoaming container to the liquid surface direction.

Due to the invention described in Item 24, nodes of the standing waves inside the above-mentioned defoaming container can be moved due to the demodulation of the vibration frequency of plural ultrasonic waves generator. Due to this, nodes of the standing waves in the above-mentioned defoaming container are moved to the liquid surface direction. Therefore, bubbles trapped by the nodes of the standing waves is collected excessively, causing defoaming difficultly can be prevented. As a result, the degree of defoaming is further improved stably.

"Ultrasonic waves" means sound waves of frequency of 20 kHz or more. Sound waves of frequency of 40 kHz or less is preferable.

"Standing waves" are periodical waves, in which the spatial amplitude distribution is fixed, which occurs due to superposing of an advancing wave, which advances in a reverse direction. Since reflections of the wall of the container are large in the liquid in aforesaid container, necessarily, a standing wave occurs between an advancing wave from the generator and the reflection waves of aforesaid advancing waves on the wall of the container.

"Liquid for transferring ultrasonic waves" is a liquid for transferring ultrasonic waves to the defoaming container.

ΔI, which represents the difference of the strength of sound pressure between node and anti-node of a standing wave which occurs in liquid to be defoamed inside the defoaming container [kgf/cm$^2$] represents difference between the strength of node IN of a standing wave which occurs in liquid to be defoamed inside the defoaming container [kgf/cm$^2$] and the strength of node IA of a standing wave which occurs in the liquid to be defoamed inside the defoaming container [kgf/cm$^2$]. Aforesaid difference can be calculated by the following equation.

$$\Delta I = IA - IN$$

The strength of node IN of a standing wave which occurs in liquid to be defoamed inside the defoaming container [kgf/cm$^2$] and the strength of node IA of a standing wave which occurs in liquid to be defoamed inside the defoaming container [kgf/cm$^2$] cannot be measured by means of an ordinary pressure-meter. By means of a ceramic piezoelectric element corresponding to high frequency, electrical signals proportional to sound pressure can be obtained. In inventions described in Items 1 through 12, whether or not it is included in the technological scope of the invention is determined by values measured by Honda Electronic Sound Pressure meter HUS-5 manufactured by Honda Electronics Co., Ltd. It goes without saying that a sound pressure meter is not limited to this device. Incidentally, with regard to inventions of each of Items 1 through 12, it goes without saying that it is important to satisfy equation (1) but that to use a sound meter is not an essential requirement.

Honda Electronics Sound Pressure meter HUS-5 outputs voltage corresponding to fluctuated pressure by sensing pressure fluctuation by means of a ceramic piezo-electric element. Since aforesaid voltage value is proportional to sound pressure strength, aforesaid voltage value V is converted to sound pressure strength I by multiplying conversion coefficient α as shown in the following equation.

$$I = \alpha \times V$$

Aforesaid conversion coefficient α was calculated by pouring plural kinds of liquid having different sound waves absorption ratio each other into the defoaming container, keep the temperature of the
ultrasonic waves generators, the container for the liquid for transferring ultrasonic waves, the liquid for transferring ultrasonic waves, the defoaming container and the liquid in the defoaming container and the output value of the sound pressure meter and heating energy of the liquid inside the defoaming container was compared.

At 12 points with approximately the same interval in one wavelength of the standing waves which is occurring in the liquid to be defoamed in the defoaming container and for 3 wavelength, energy was measured by the use of a Honda Electronics Sound Pressure Meter HUS-5 manufactured by Honda Electronics Co., Ltd. The measured value was converted to sound pressure strength. By means of the sine waves approximation, the strength of node IN of a standing wave which occurs in liquid to be defoamed inside the defoaming container [kgf/cm$^2$] and the strength of node IA of a standing wave which occurs in liquid to be defoamed inside the defoaming container [kgf/cm$^2$] are measured.

Namely, with regard to plural kinds of liquids L1, L2 . . . having different sound waves absorption ratio each other, each liquid L1, L2 . . . were contained in the same container. Sound waves having a prescribed strength were introduced to aforesaid defoaming container. By actually measuring heated energy EH (L1), EH (L2) . . . [J] which heats by absorbing sound waves in aforesaid defoaming container, the strength of node IN of a standing wave which occurs in liquid to be defoamed inside the defoaming container [kgf/cm$^2$] and the strength of node IA of a standing wave which occurs in the liquid to be defoamed inside the defoaming container [kgf/cm$^2$] can be calculated due to correspondence between voltage value V (L1), V(L2) . . . [V] outputted from Honda Electronics Sound Pressure Meter HUS-5 and heated energy EH (L1), EH (L2) . . . [J] which is heated by absorbing sound waves in aforesaid defoaming container.

Sound waves energy ES (L1), ES(L2) . . . [J] in aforesaid defoaming container and heated energy EH (L1), EH (L2) ... [J] which is heated by absorbing sound waves in aforesaid defoaming container have a relationship which satisfies the following equation.

$$ES(L1)-ES(L2)=EH(L2)-EH(L1)$$

Between sound pressure I, sound waves energy ES, liquid density ρ and sound speed VS of the liquid, there is a relationship satisfying the following equation.

$$I^2=ES \times \rho \times VS$$

Accordingly, voltage value V (L1), V(L2) ... [V], sound waves energy ES (L1), ES (L2) ... [J] in aforesaid container, density ρ of the liquid in the container (L1), ρ (L2) ... [kg/m$^3$] and sound speed VS (L1), VS (L2) ... of the liquid in the container [m/sec] satisfy the following equation.

$$(\alpha \times V(L1))^2/\rho(L1)/VS(L1) - (\alpha \times V(L2))^2/\rho(ZL2)/VS(L2) = ES(L1) - ES(L2)$$

Accordingly, conversion coefficient α can be calculated by the following equation.

$$\alpha = (EH(L2)-EH(L1))/((\rho(L1) \times VS(L1)/V(L1)^2) - (\rho(L1) \times VS(L1)/V(L2)))^{1/2}$$

Incidentally, conversion coefficient α in Honda Electronics Sound Pressure meter HUS-5 controlled by the present inventor measured by the above-mentioned method was as follows: It is necessary for each Honda Electronics Sound Pressure meter HUS-5 to measure conversion coefficient α.

$$\alpha=1000/4$$

Flow rate FR [mm/sec] of the above-mentioned liquid to be defoamed at the above-mentioned liquid outlet port of the above-mentioned defoaming container can be measured by measuring liquid amount which flowed out per unit time or by measuring with an ordinary flow rate meter.

Viscosity CV [cp] of the above-mentioned liquid to be defoamed is measured by a drop type viscosity meter.

Frequency SF [kHz] of the above-mentioned ultrasonic waves can be seen by means of specific or displayed frequency of the ultrasonic waves generator. In addition, it can be measured by an ordinary frequency measurer.

Degree of air unsaturation of the liquid to be defoamed in the container to be defoamed is defined by the following equation.

$$AS=(1-A/B) \times 100 \ (\%)$$

A: Density of dissolved air of the liquid to be defoamed in the container to be defoamed (%)
B: Density of the saturated dissolved air in the liquid to be defoamed (%)

Density of dissolved air of the liquid to be defoamed in the container to be defoamed A can be calculated based on the ratio of oxygen in the air after measuring the density of dissolved oxygen of the liquid to be defoamed in the container to be defoamed by means of a dissolved oxygen densitometer.

Density of saturated dissolved air of the liquid to be defoamed in the container to be defoamed can be calculated based on the ratio of oxygen in the air after measuring the density of dissolved oxygen of the liquid to be defoamed in the container to be defoamed by means of a dissolved oxygen densitometer after dissolving air till saturation under the same conditions (pressure and temperature) as those of the container to be defoamed.

DETAILED DESCRIPTION OF THE PREFERRED EMBODIMENT

As an example of the present invention, the following embodiment will be shown. The following embodiment exhibits a preferable example of the present invention. It does not limit the meaning of terms or technological scope. Embodiment 1

Figure 1:
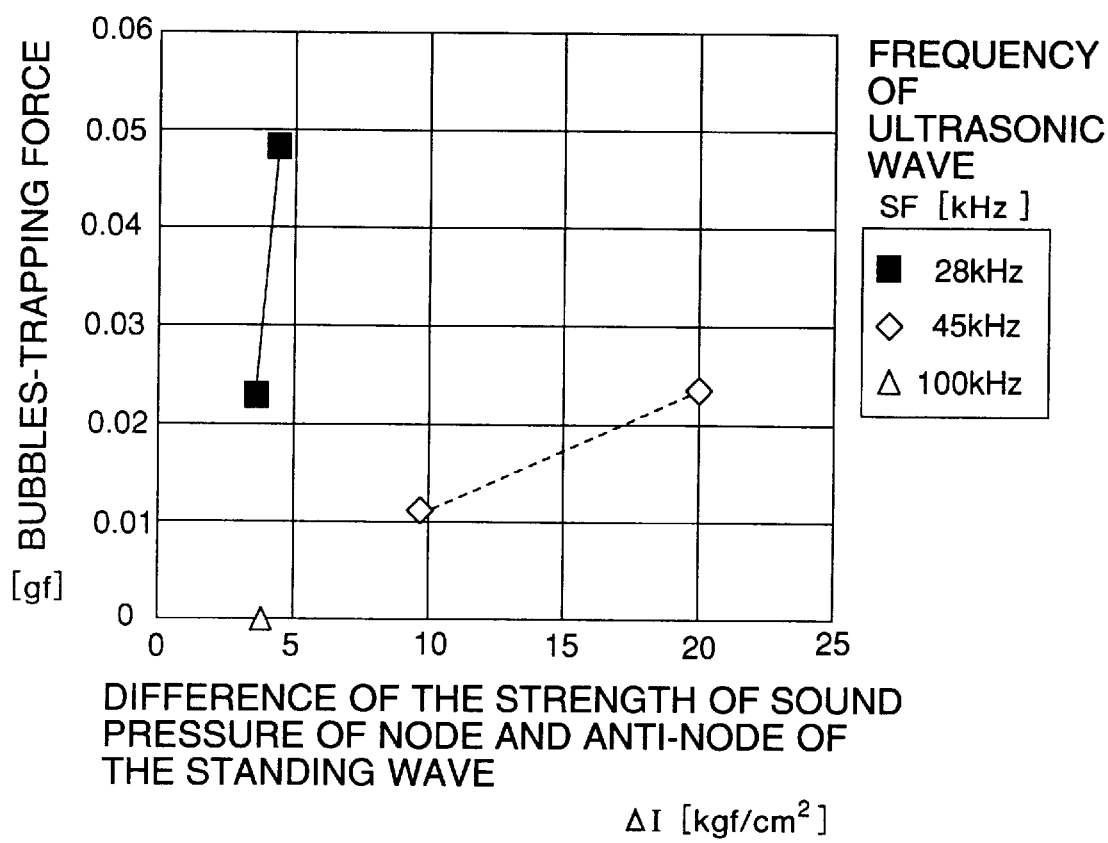
FIG. 1 is a graph showing influence given by the difference of the strength of sound pressure of nodes and antinodes of the standing waves on the trapping force of bubbles and the frequency of ultrasonic waves.
Figure 2:
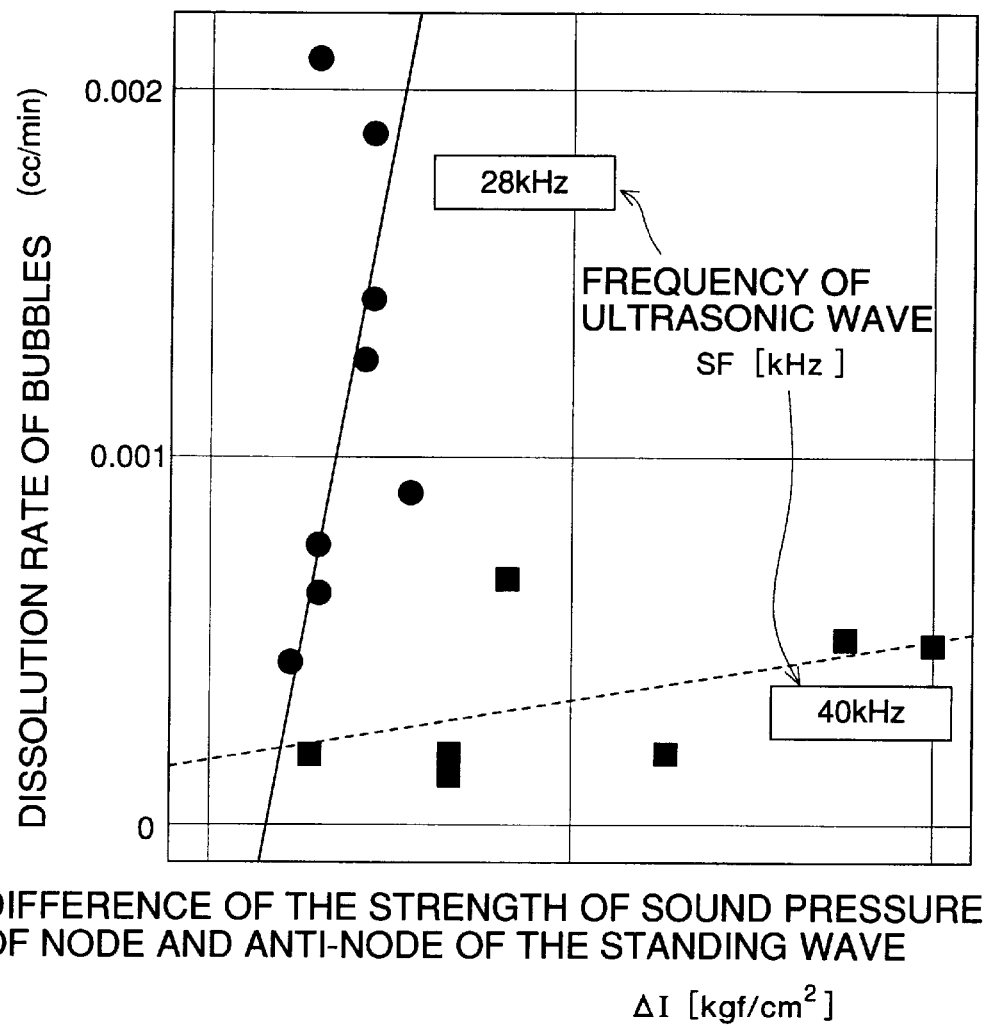
FIG. 2 is a graph showing influence given by the difference of the strength of sound pressure of nodes and antinodes of the standing waves on the dissolution speed of bubbles and the frequency of ultrasonic waves.
Figure 3:
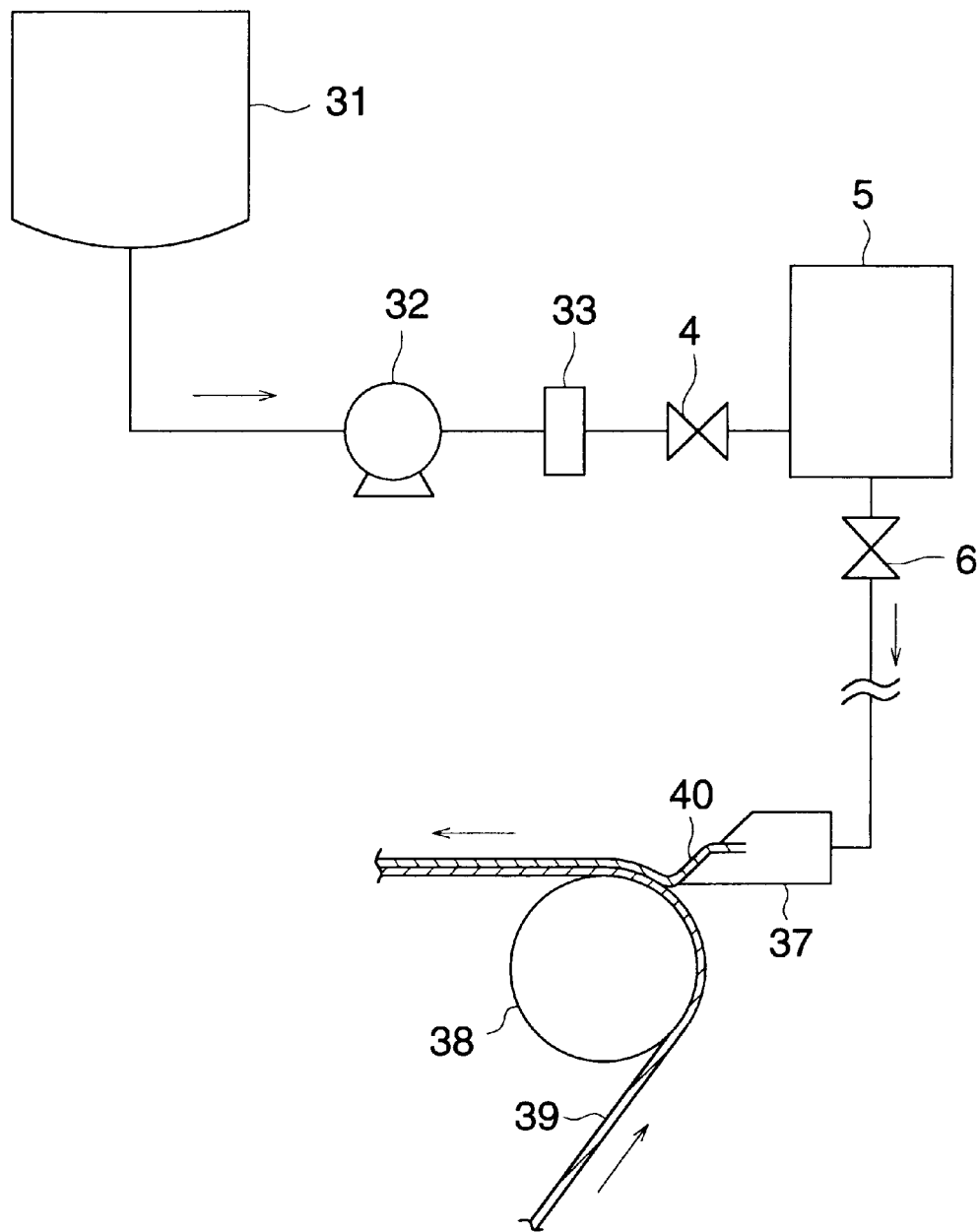
FIG. 3 is an explanation drawing showing one example of a photographic emulsion coating liquid preparation step.
Figure 4:
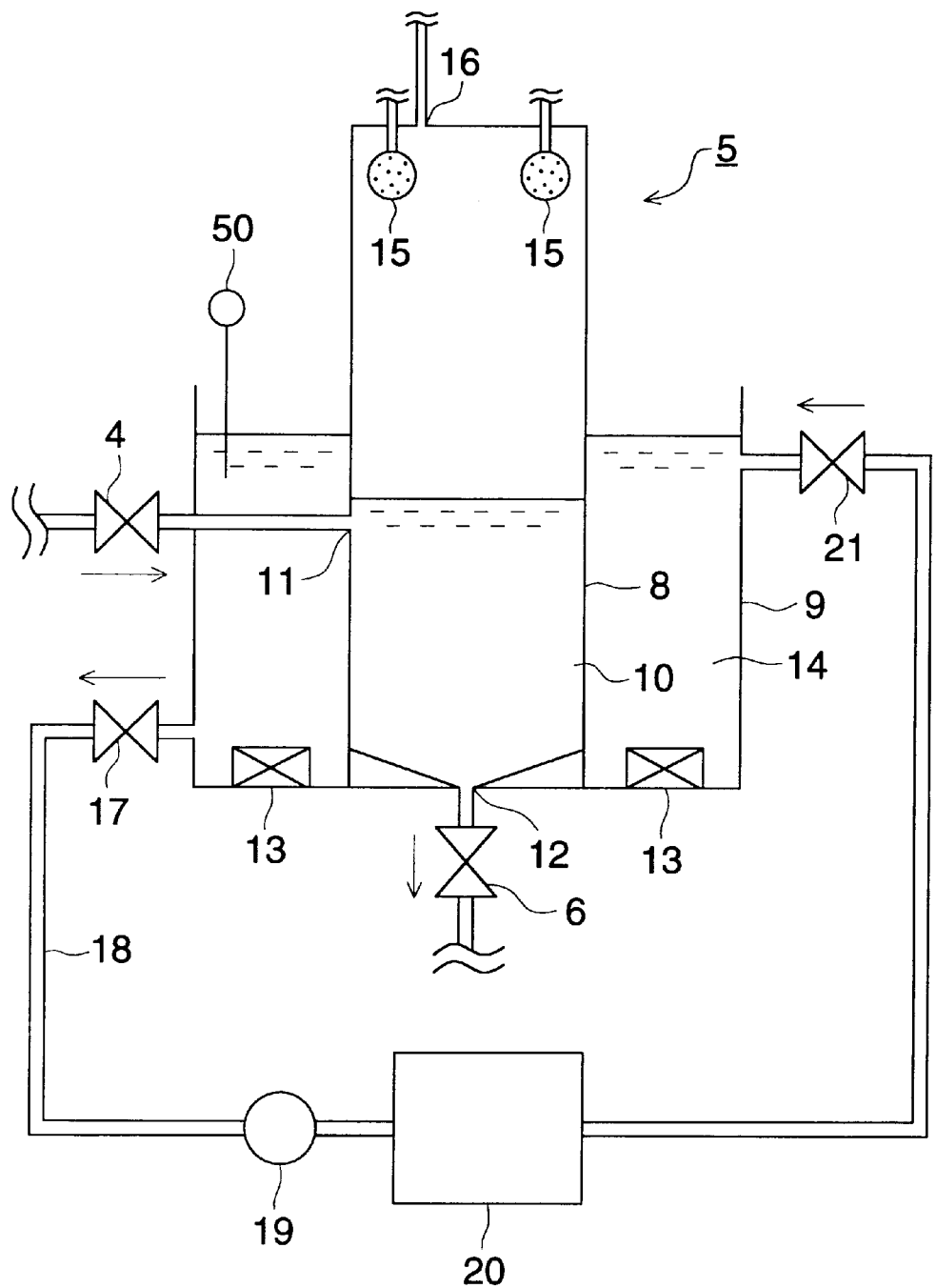
FIG. 4 is a schematic cross sectional view showing one example of an embodiment of ultrasonic waves defoaming device of the present invention.

Using FIGS. 3 and 4, the present embodiment will be explained. FIG. 3 is a schematic block diagram showing a manufacturing apparatus of a silver halide photographic light-sensitive material of the present embodiment. FIG. 4 is a schematic cross sectional view showing one example of an ultrasonic defoaming apparatus of the present invention.

In the present embodiment, the liquid to be defoamed is a silver halide emulsion coating liquid (hereinafter, it is abbreviated as a coating liquid) for silver halide photographic light-sensitive material. Aforesaid silver halide emulsion coating liquid for silver halide photographic light-sensitive material in which gelatin is dissolved to be adjusted in an aqueous solution while silver halide grains wherein oil drops in which sensitizing dyes and couplers have been dissolved are adhered are dispersed to be set is poured into evacuated container 31.

By means of liquid feeding pump 32, the coating liquid is fed from evacuating container 31 to filter 33. When the coating liquid passes filter 33, any debris inside the coating liquid is removed. The coating liquid is sent to ultrasonic defoaming device 5 through in-flowing cock 4. The mechanism of ultrasonic defoaming device 5 will be detailed later.

After the coating liquid is subjected to defoaming in ultrasonic defoaming device 5, coating liquid 40 is sent to coater 37 through out-flowing cock 6. By means of coater 37, coating liquid 40 is coated on light-sensitive material support 39 supported by back roll 38.

In the present embodiment, ultrasonic defoaming device 5 is composed of defoaming tank 8, which is a defoaming container, which houses photographic emulsion coating liquid 10 for defoaming, jacket 9 which houses water 14 which is a liquid for transferring ultrasonic waves, ultrasonic waves generator 13, pump 19 which circulates liquid for transferring ultrasonic waves and deaeration means 20. Incidentally, the form of the defoaming container is not specifically limited. As a defoaming container, a tube such as a feeding tube may be used.

Jacket 9 is a pillar-shaped. At the center of aforesaid jacket 9, pillar-shaped defoaming tank 8 is provided. Around defoaming tank 8 inside jacket 9 is filled with water 14 which is a liquid for transferring ultrasonic waves.

In addition, ultrasonic waves generators 13 are provided inside jacket 9.

Defoaming tank 8 of the present embodiment is a pillar whose diameter is 200 mm. At 300 mm from the bottom surface on the side wall of aforesaid defoaming tank 8, liquid inlet port 11 through which a photographic emulsion coating liquid flows in is provided. On the bottom surface, liquid flowing port 12 through which the photographic emulsion coating liquid flows out is provided. The bottom of aforesaid defoaming tank is cone-shaped so that the photographic emulsion coating liquid easily flows out. At the bottom of the cone, liquid flowing port 12 is provided. Ordinarily, the flow amount of the liquid is regulated by in-flowing valve 4 and out-flowing valve 6 in such a manner that the gas/liquid interface is located above liquid inlet port 11.

The height of the liquid surface of water 14 in jacket 9 is higher than the height of the liquid surface of photographic emulsion coating liquid 10 inside defoaming tank 8 in such a manner that the entire photographic emulsion coating liquid 10 inside defoaming tank 8 is stably subjected to ultrasonic wave irradiation. In order to circulate water inside jacket 9 for defoaming, pump 19 and defoaming means 20 are provided on jacket 9 through liquid-introducing tube 18.

Above defoaming tank 8, shower ball 15 for washing and pressure port 16 for conducting pressure inside defoaming tank 8 are provided.

Hereinafter, how to defoam the photographic emulsion coating liquid using ultrasonic defoaming device 5 is explained. Photographic emulsion coating liquid 10 entered into defoaming tank 8 from liquid inlet port 11 through flowing-in valve 4 is given pressure from pressure port 16. By means of ultrasonic generator 13, ultrasonic waves are uniformly irradiated through water 14 which is a liquid for transferring ultrasonic waves so that defoaming is conducted inside photographic emulsion coating liquid 10. Photographic emulsion coating liquid 10 which has been subjected to defoaming flows out from liquid flow outlet port 12. Frequency of ultrasonic waves is preferably 5–40 kHz.

When water 14 inside jacket 9 is replaced at a prescribed interval, by opening flowing-out valve 17 for operating pump 19, water inside jacket 9 is introduced to defoaming means 20 through liquid-introducing tube 18. In defoaming means 20, a defoaming membrane is provided. When water passes aforesaid defoaming membrane, water, which is a liquid for transferring ultrasonic waves, is subjected to defoaming. In defoaming means 20, the density of dissolved air is reduced under conditions of pressure and temperature during use of water 14, which is a liquid for transferring ultrasonic waves, by which the degree of unsaturation of the density of dissolved air under condition of using water is set to be 10% or more. In the present embodiment, the degree of unsaturation of the density of dissolved air under condition of using water is set to be 50%. Defoamed water enters into jacket 9 again through liquid introducing tube by opening flowing-in valve 21. Incidentally, water 14 inside jacket 9 is caused to circulate by pump 19 for defoaming water any time.

Since the liquid to be defoamed is subjected to ultrasonic irradiation with water in which the degree of unsaturation of the density of dissolved air under condition of using water is set to be 10% or more as liquid for transferring ultrasonic waves, stable ultrasonic waves can effectively be irradiated on photographic emulsion coating liquid 10 inside defoaming tank 8. Therefore, defoaming efficiency can be enhanced.

In jacket 9, dissolved oxygen densitometer 50 which senses oxygen density dissolving in water 14 is provided. From the sensing results of dissolved oxygen densitometer 50, the density of dissolved air under conditions of pressure and temperature during use is calculated. From the results and the density of saturated dissolved air under conditions of pressure and temperature during use, the degree of unsaturation of the density of dissolved air in water which is a liquid for transferring ultrasonic waves can be calculated. Therefore, at any time, the degree of unsaturation of the density of dissolved air in water which is a liquid for transferring ultrasonic waves can be sensed.

As defoaming means 20, an evacuation tank is used for defoaming due to evacuation.

When replacing a photographic emulsion coating liquid, as necessary, inside the defoaming tank can easily be washed by spraying washing water from shower ball 15.

Embodiment 2

Figure 5:
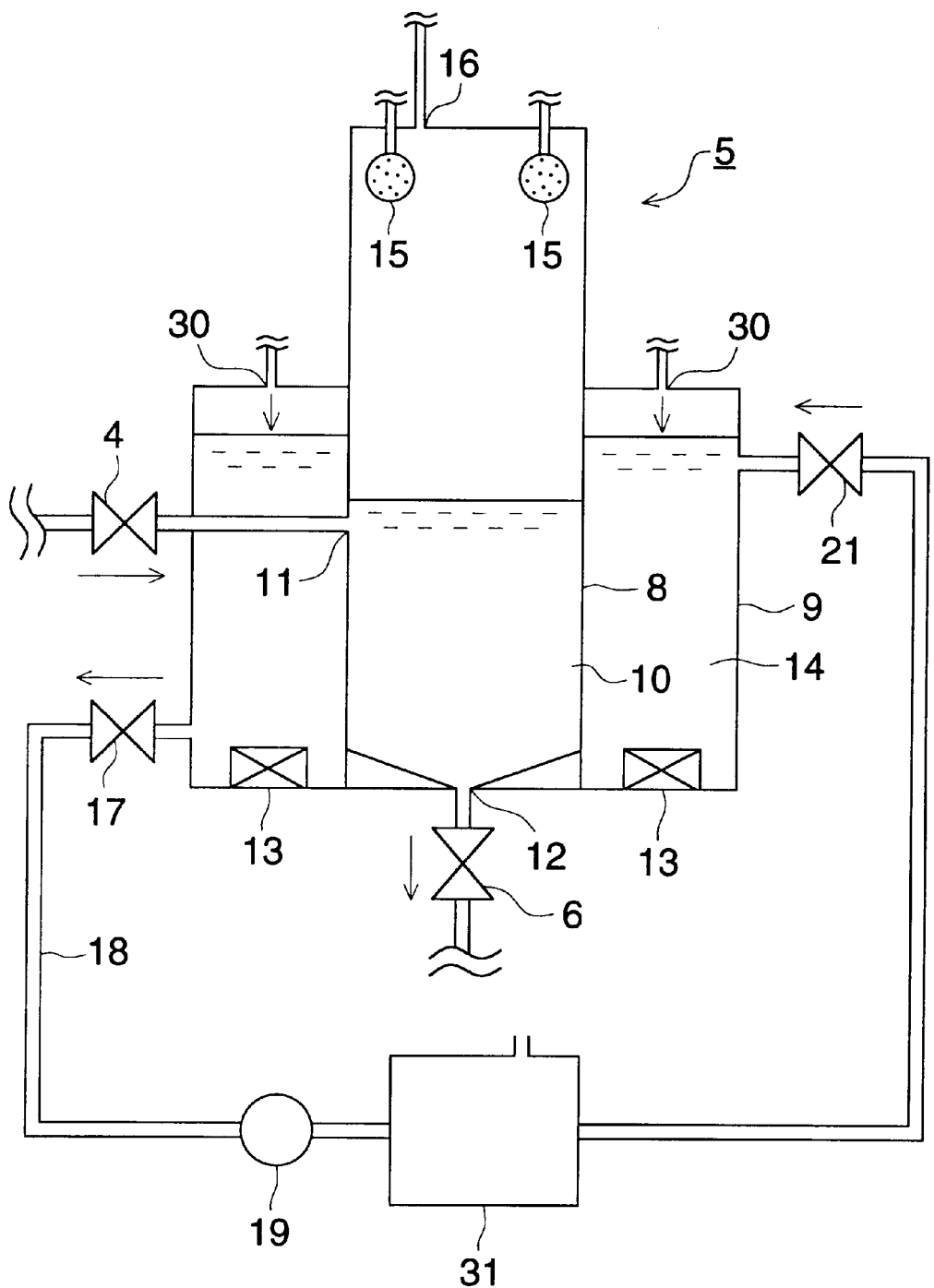
FIG. 5 is a schematic cross sectional view showing another example of an embodiment of ultrasonic waves defoaming device of the present invention.

An embodiment in which the degree of unsaturation of the density of the dissolved air under condition of using water, which is a liquid for transferring ultrasonic waves, is set to be 10% or more by providing pressure onto water, which is a liquid for transferring ultrasonic waves, not by defoaming will be explained referring to FIG. 5.

Structure of defoaming tank 8 and the mechanism of defoaming are the same as those shown in the embodiment of FIG. 4. Therefore, an explanation in detail is omitted.

In the present embodiment, jacket 9 has a tightly-closed structure. A pressure means (not illustrated) presses inside jacket 9 through pressure port 30 for jacket. By pressing jacket 9, the density of saturated dissolved air in water 14, which is a liquid for transferring ultrasonic waves, under conditions of pressure and temperature during use is increased, enhancing the degree of unsaturation of the density of dissolved air under conditions of pressure and temperature during use to 10% or more. In the present embodiment, the degree of unsaturation of the density of dissolved air under conditions of pressure and temperature during use is arranged to be 50%.

Since the liquid to be defoamed is subjected to ultrasonic irradiation with water in which the degree of unsaturation of the density of dissolved air under condition of using water is set to be 10% or more as liquid for transferring ultrasonic waves, stable ultrasonic waves can effectively be irradiated on photographic emulsion coating liquid 10 inside defoaming tank 8. Therefore, defoaming efficiency can be enhanced.

Under pressure, air is easily dissolved in water. Therefore, at a prescribed interval, flowing-out valve 17 is opened and pump 19 is operated. Due to this, water inside jacket 9 is introduced to pressure-constant tank 31 through liquid-introducing tube 18. Pressure-constant tank 31 is opened to communicate with ambient air. In pressure-constant tank 31, by returning pressure to an ordinary one, dissolved air due to pressure in jacket 9 is defoamed so that increase of the density of dissolved air in water 14, which is a liquid for transferring ultrasonic waves, under conditions of pressure and temperature during use is prevented. Water returned to normal pressure in pressure-constant tank 31 flows into jacket 9 again through a liquid-introducing tube by opening flowing-in valve 21. Incidentally, water 14 inside jacket 9 is circulated by pump 19. At any time, water is returned to normal pressure so that increase of the density of dissolved air may be prevented.

Depending upon the level of pressing, it is possible to arbitrarily change the degree of unsaturation of the density of dissolved air. If only pressure is known, the density of saturated dissolved air in water under conditions of pressure and temperature during use is known. Therefore, the degree of unsaturation of the density of dissolved air in water under conditions of pressure and temperature during use is found. Therefore, only by providing a pressure-meter, it is not necessary to provide dissolved oxygen densitometer 50 which senses oxygen density which is dissolved in water 14 in jacket 9.

Incidentally, neither a defoaming means nor pressure means are provided. Water defoamed in such a manner that the degree of unsaturation of the density of dissolved air under conditions of pressure and temperature during use may be, at any time, fed to jacket 9.

EXAMPLE 1

As an ultrasonic defoaming device, an ultrasonic defoaming device described in an embodiment of the invention will be used. Defoaming conditions are as follows:
Liquid to be defoamed:
    Photographic emulsion coating liquid
    containing gelatin of 5 wt %, its
    viscosity is 40 cp
Flow rate of liquid to be defoamed: 3 liter/min. (1.6 mm/sec.)
Pressure in a defoaming tank: 1 $kg/cm^2$
Ultrasonic waves irradiation condition: 25 kHz
Liquid for transferring ultrasonic waves:
    Water which has passed a defoaming membrane, in which the degree of unsaturation of the density of dissolved air under conditions of pressure and temperature during use was 50%. 40° C.
Difference of the strength of node and anti-node of the standing waves which occurs in the liquid to be defoamed in the defoaming tank: 0.2 $kgf/cm^2$
Degree of unsaturation of air in the liquid to be defoamed: 50%

Under the above-mentioned conditions, in the present ultrasonic defoaming device, by means of three kinds of outputting ultrasonic waves generator, i.e., 500 W, 350 W and 250 W, the photographic emulsion coating liquid was subjected to defoaming.

COMPARATIVE EXAMPLE 1

As an ultrasonic wave defoaming device, an ultrasonic defoaming device identical to that used in Example was used. Only liquid for transferring ultrasonic waves was changed. Defoaming tank: Pillar having diameter of 200 mm Liquid to be defoamed:
    Photographic emulsion coating liquid
    containing gelatin of 5 wt %, its
    viscosity is 40 cp
Flow rate of liquid to be defoamed: 3 liter/min. (1.6 mm/sec.)
Pressure in a defoaming tank: 1 $kg/cm^2$
Ultrasonic waves irradiation condition: 25 kHz
Liquid for transferring ultrasonic waves:
    Water which has passed a defoaming membrane, in which the degree of unsaturation of the density of dissolved air under conditions of pressure and temperature during use was 5%. 40° C.
Difference of the strength of node and anti-node of the standing waves which occurs in the liquid to be defoamed in the defoaming tank: 0.2 $kgf/cm^2$
Degree of unsaturation of air in the liquid to be defoamed: 50%

Under the above-mentioned conditions, in the present ultrasonic defoaming device, by means of three kinds of outputting ultrasonic waves generator, i.e., 500 W, 350 W and 250 W, the photographic emulsion coating liquid was subjected to defoaming.

(Results)

With regard to the ultrasonic waves defoaming device of Example, in all cases in which outputting by the ultrasonic generator is 500 W, 350 W and 250 W, defoaming could be conducted completely. No bubbles were observed in the photographic emulsion coating liquid flowing out from the defoaming device.

To the contrary, with regard to the ultrasonic defoaming device of Comparative example, only when outputting by the ultrasonic generator is 500 W, defoaming could be conducted completely. However, when outputting by the ultrasonic generator is 350 W and 250 W, complete defoaming could not be conducted. Bubbles remained in the photographic emulsion coating liquid flowing out from the defoaming device. (Relationship between the degree of unsaturation of the density of dissolved air in a liquid for transferring ultrasonic waves under conditions of pressure and temperature during use, amplitude of standing waves and fluctuation of the strength of ultrasonic waves over time)

Figure 6:
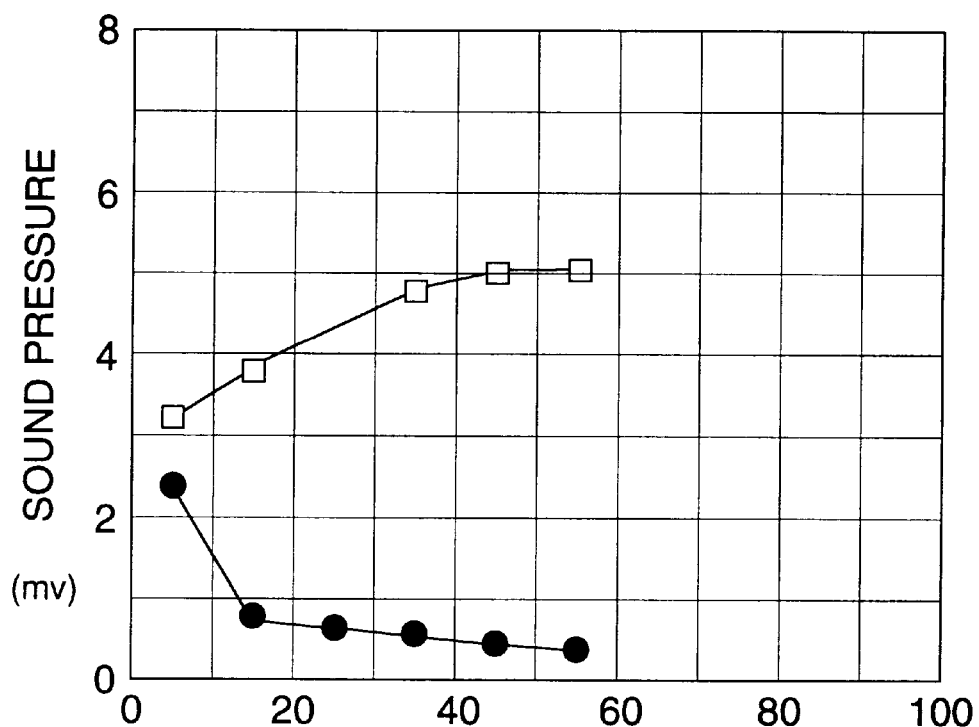
FIG. 6 is a graph showing relation between the degree of unsaturation of dissolved air density of liquid for transferring ultrasonic waves under conditions of pressure and temperature during uses, amplitude of standing waves and fluctuation of the strength of ultrasonic waves over time.

FIG. 6 is a graph showing relationship between the degree of unsaturation of the density of dissolved air in a liquid for transferring ultrasonic waves under conditions of pressure and temperature during use, amplitude of standing waves and fluctuation of the strength of ultrasonic waves over time, obtained by using Honda Electronic Sound Pressure meter HUS5.

The amplitude of the standing waves is an amplitude between node and anti-node of the standing waves which occurs in the liquid to be defoamed inside the defoaming tank due to irradiation of the ultrasonic waves. If aforesaid amplitude is large, so-called "bubble trap effect" in which bubbles are trapped to a node portion becomes larger, increasing defoaming effects.

Fluctuation of the strength of ultrasonic waves over time shows a value how the strength of the ultrasonic waves fluctuates within a prescribed time (in the present experiment, 0.5 min.). That aforesaid value is small shows that the strength of ultrasonic waves is stable. When the strength of ultrasonic waves is stable, the position of nodes and that of anti-nodes of the standing waves become stable. "Bubble trap effect" becomes larger, increasing defoaming effects.

In the experiment, water was poured into a jacket in a defoaming device similar to Example. Its water temperature was set to be 40° C. The degree of unsaturation of the density of the dissolved air in water under conditions of pressure and temperature during use was changed to be 5%, 15%, 25%, 35%, 45% and 55%. At each of the degree of unsaturation of the density of the dissolved air, ultrasonic waves were irradiated under the same condition as Example (25 Hz, 250 W). In water in the jacket, plural sound pressure measurer was provided. By measuring sound pressure in water by means of aforesaid sound pressure measurer, amplitude of the standing waves and fluctuation of the strength of ultrasonic waves over time were measured.

Amplitude of the standing waves was defined to be the difference of the sound pressure at node and that at anti-node of the standing waves.

Fluctuation of the strength of ultrasonic waves over time was defined to be the difference of the maximum sound pressure and the minimum sound pressure at a prescribed position in water.

As shown in the graph of FIG. 6, the larger the degree of unsaturation of the density of the dissolved air in water, which is a liquid for transferring ultrasonic waves, under conditions of pressure and temperature during use, the larger the amplitude of the standing waves, resulting in improving defoaming effects. When the degree of unsaturation of the density of the dissolved air in water, which is a liquid for transferring ultrasonic waves, under conditions of pressure and temperature during use is 10% or more, the value of the strength of ultrasonic waves over time is quickly reduced. It is seen that the strength of ultrasonic waves is stabilized, improving defoaming effects.

Therefore, when the degree of unsaturation of the density of the dissolved air in water, which is a liquid for transferring ultrasonic waves, under conditions of pressure and temperature during use is 10% or more, defoaming effect is enhanced.

Due to the above-mentioned embodiments 1 and 2, defoaming effect can be enhanced without changing the form of the defoaming tank and the ultrasonic waves generator and processing the liquid to be defoamed. Due to enhancing the defoaming effect, defoaming effect at the same level as conventionally even when outputting of irradiating the ultrasonic waves is reduced compared with conventionally. Thus, energy saving is achieved.

In addition, without noticeably modifying a conventional ultrasonic waves defoaming device which used to use liquid for transferring ultrasonic waves as a primary medium, it is possible to provide a method of defoaming ultrasonic waves and ultrasonic waves defoaming device which can enhance defoaming effect.

Embodiment 3

Figure 7:
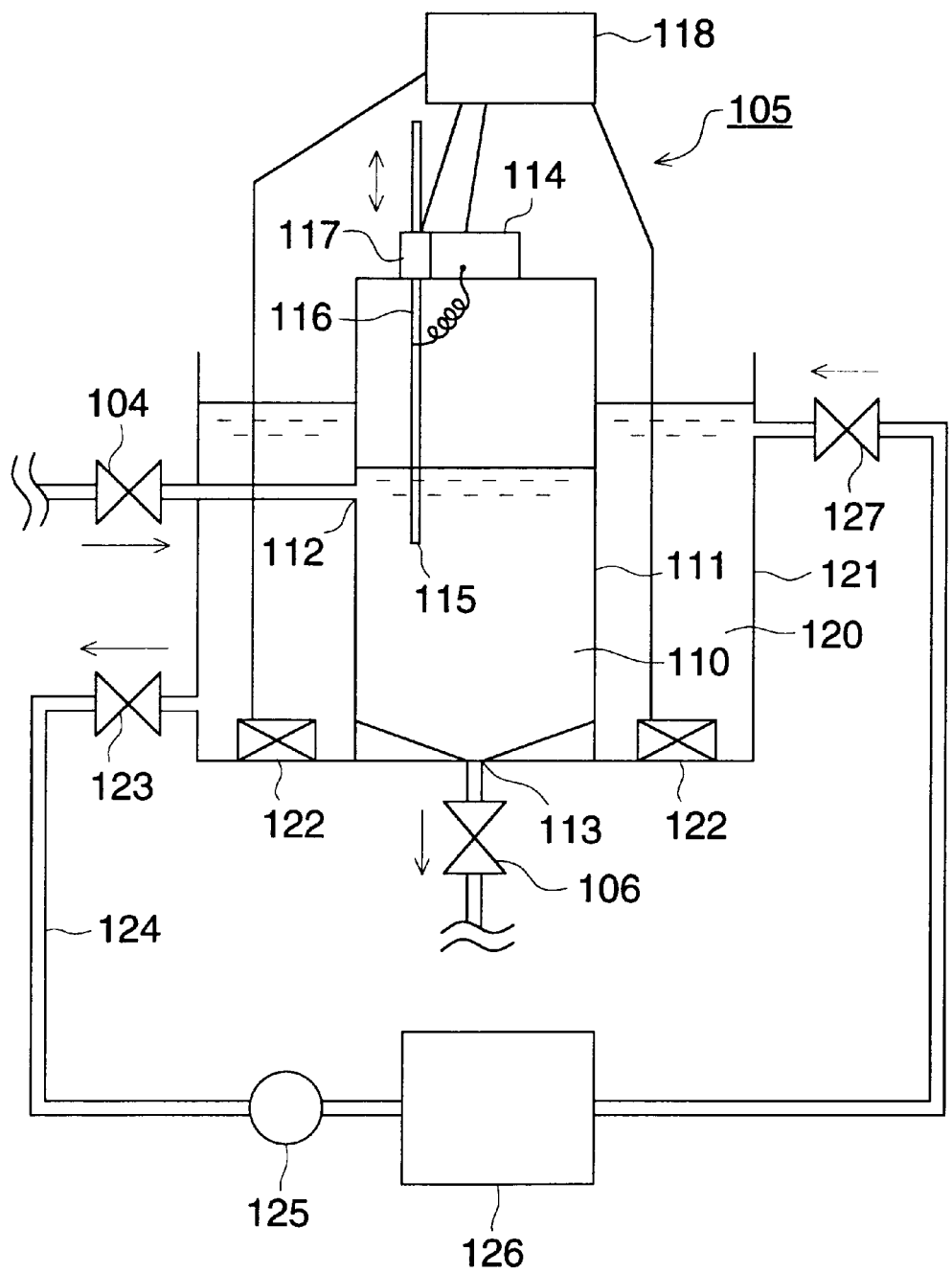
FIG. 7 shows a schematic block cross sectional view of the ultrasonic waves defoaming device in Embodiments 1 and 2.

As shown in FIG. 7, ultrasonic waves defoaming device 105 in the present embodiment is composed of defoaming container 111 which houses coating liquid 110 and defoam, ultrasonic waves transferring liquid container 121 which houses ultrasonic waves transferring liquid 120 and ultrasonic waves generator 122.

Figure 8:
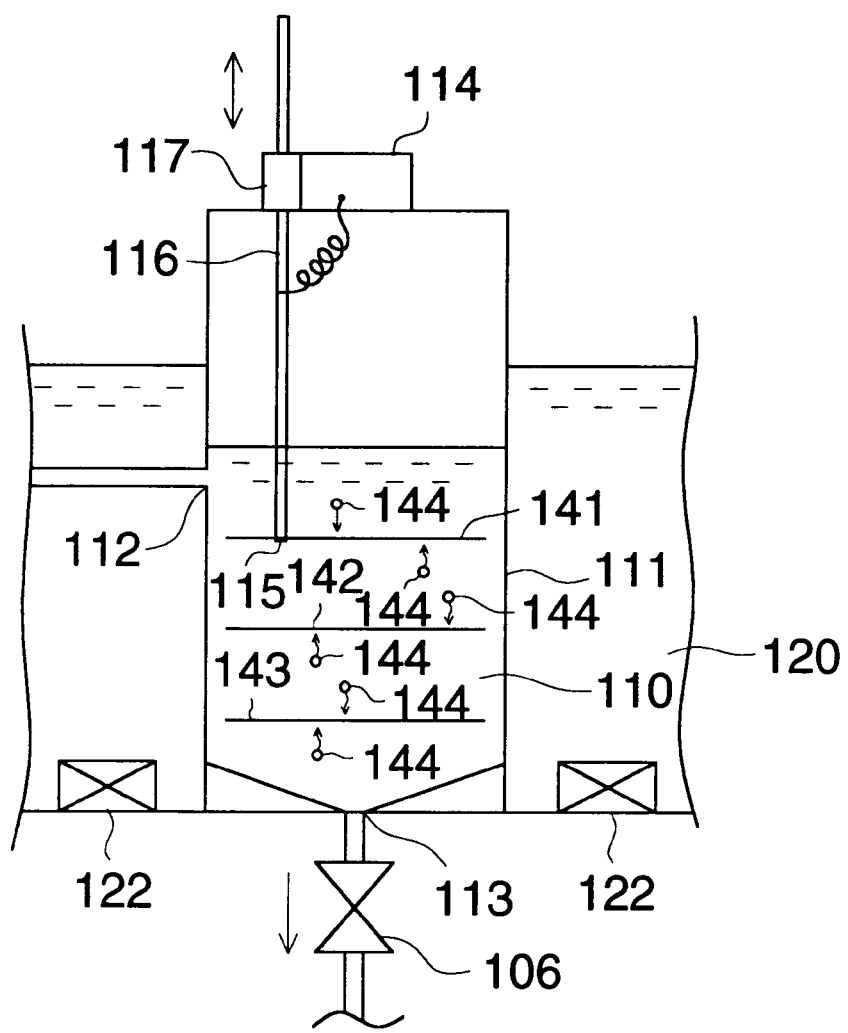
FIG. 8 is a schematic block cross sectional view showing standing waves which occurs in the ultrasonic waves defoaming device in Embodiment 1.

Ultrasonic waves transferring liquid container 121 is a pillar-shaped. Inside thereof, a pillar-shaped defoaming container 111 is provided. It is so arranged that the central shaft of ultrasonic waves transferring liquid container 121 coincides with the central shaft of pillar-shaped defoaming container 111. Around defoaming container 111 inside ultrasonic waves transferring liquid container 121 is filled with ultrasonic waves transferring liquid 120. Inner bottom of ultrasonic waves transferring liquid container 121, two pieces of ultrasonic waves generators 122 are symmetrically provided each other with the central shaft of pillar-shaped defoaming container 111. Due to that two pieces of ultrasonic waves generators 122 vibrate ultrasonic waves having the same frequency, as shown in FIG. 8, multiple nodes 141, 142 and 143 of standing waves occur in the liquid to be defoamed inside defoaming container 101. With regard to aforesaid nodes 141, 142 and 143, amplitude is constantly approximately 0. From ambient, bubbles 144 are collected. Incidentally, ultrasonic waves transferring liquid 120 may be under-ground water or tap water.

Defoaming container 111 is pillar whose diameter is 260 mm. It has liquid inlet port 112, on a side wall, through which a coating liquid enters at the height of 300 mm from the bottom. On the bottom surface, it has liquid flowing outlet 113. In addition, the bottom surface is cone-shaped so that the coating liquid easily flows out. At the bottom of the cone, liquid flowing outlet 113 is provided. In order that the liquid surface of coating liquid 110, i.e., gas/liquid interface, is located above liquid inlet port 112, flow rate of liquid is regulated by means of flowing-in cock 104 and flowing-out cock 106.

The liquid surface of ultrasonic waves transferring liquid 120 inside ultrasonic waves transferring liquid container 121 is located higher than the liquid surface of coating liquid 110 inside defoaming container 111 in order to stably irradiate ultrasonic waves on whole coating liquid 110 inside defoaming container 111.

Above defoaming container 111, sound pressure meter 114 and probe vertical driver 117 which vertically actuates bar-shaped member 116 in which probe 115 of sound pressure meter 114 is provided at the edge thereof are provided. Aforesaid probe 115 is connected to sound pressure meter 114 by means of a wire. Sound pressure of the ultrasonic waves borne on the edge of probe 115 mounted at the end of aforesaid bar-shaped member 116 is measured with sound pressure meter 114, and outputs it to control section 118. Control section controls output of ultrasonic waves of ultrasonic waves generator 122 in accordance with sound pressure measured by sound pressure meter in such a manner as to satisfy the following Formula (1).

Formula (1)

$$\Delta I*AS/(FR*CV*SF) \geq 0.0026$$

wherein $\Delta I$ represents the difference of the strength of sound pressure between node and anti-node of a standing wave which occurs in liquid to be defoamed inside the above-mentioned defoaming container [kgf/cm$^2$], FR represents flow rate of the above-mentioned liquid to be defoamed at the above-mentioned liquid flowing outlet 113 of the above-mentioned defoaming container [mm/sec.], CV represents the viscosity of the above-mentioned liquid to be defoamed [cp]

SF represents frequency of the above-mentioned ultrasonic waves [kHz] and

AS represents the degree of air unsaturation of the above-mentioned liquid to be defoamed in the above-mentioned defoaming container.

At a prescribed interval, while probe 115 is moved by means of probe vertical driver 117, sound pressure of the ultrasonic waves borne on the edge of probe 115 is continuously measured by sound pressure meter 114, and outputs to control section 118. Based on correspondence between change of sound pressure over time measured by sound pressure meter 114 and change of the position of probe 115 over time, control section 118 senses whether or not at least one node of standing waves exists between liquid inlet port 112 in defoaming container 111 and liquid flowing outlet 113 in defoaming container 111. If control section 118 senses that at least one node of standing waves exists between liquid inlet port 112 in defoaming container 111 and liquid flowing outlet 113 in defoaming container 111, defoaming is continued. If control section 118 senses that no node of standing waves exists between them, alarm sounds and defoaming is immediately finished. Coating is discontinued. Incidentally, the value of equation (1) is preferably 0.004 or more and more preferably 0.01 or more.

Hereinafter, how to defoam coating liquid 10 using ultrasonic defoaming device 5 will be explained. Coating liquid 110, flowed into defoaming container 111 through liquid inlet port 112 by means of flowing-in cock 104 is subjected to ultrasonic waves irradiation through ultrasonic waves transferring liquid 120 inside ultrasonic waves transferring liquid container 121 by means of ultrasonic waves generator 122, and then defoaming. Defoamed coating liquid 110 flows out through liquid flowing outlet 113.

In order to circulate ultrasonic waves transferring liquid 120 for defoaming, pump 125 and defoaming tank 126 are provided to ultrasonic waves transferring liquid container 121 through flowing-out valve 123 and flowing-in valve 127. At a prescribed interval, flowing-out valve 123 and flowing-in valve 127 are opened. By actuating pump 125, ultrasonic waves transferring liquid 120 inside ultrasonic waves transferring liquid container 121 is introduced to defoaming tank 126 through liquid feeding tube 124. In defoaming tank 126, a defoaming membrane is provided. Due to passage of ultrasonic waves transferring liquid 120 through aforesaid defoaming membrane, ultrasonic waves transferring liquid 120 is subjected to defoaming. In defoaming tank 126, the degree of unsaturation of the density of dissolved air in ultrasonic waves transferring liquid 120 under condition of using is decreased so that the degree of unsaturation of the density of dissolved air in ultrasonic waves transferring liquid 120 under condition of using in ultrasonic waves transferring liquid container 121 is set to be 10% or more [50% or less]. Incidentally, the degree of unsaturation of dissolved air is preferably 50% or less. Defoamed ultrasonic waves transferring liquid 120 flows into ultrasonic waves transferring liquid container 121 again from flowing-in valve 127 through the liquid feeding tube. Incidentally, ultrasonic waves transferring liquid 120 in ultrasonic waves transferring liquid container 121 is constantly circulated by means of pump 125 for defoaming ultrasonic waves transferring liquid 120. Due to this, efficiency of ultrasonic waves transferring can be improved. In addition, by pressing the liquid for transferring ultrasonic waves, the degree of unsaturation of the dissolved air may be 10% or higher.

Embodiment 4

The present embodiment is a varied embodiment of embodiment 3. All of where the present embodiment is different from embodiment 3 will be explained using FIGS. 9(A) and (B) which shows general change over time of vibration frequency and vibration waveslength of an ultrasonic defoaming device in Embodiment 4.

Figure 9:
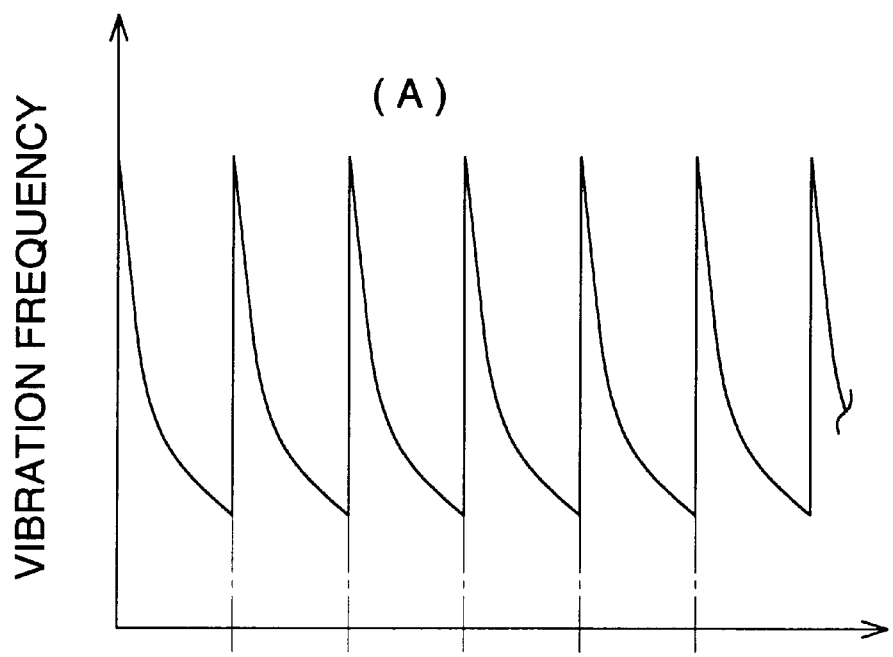
FIGS. 9(A) and 9(B) are drawings showing schematic change over time of vibration frequency of ultrasonic waves defoaming device and vibration waveslength of Embodiment 2.
Figure 9:
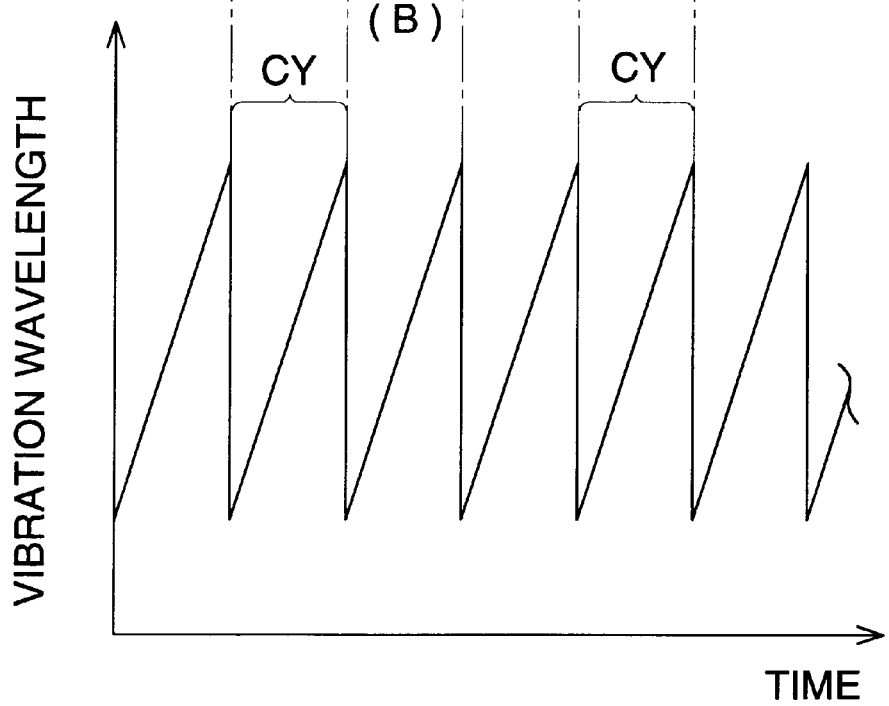
Figure 10:
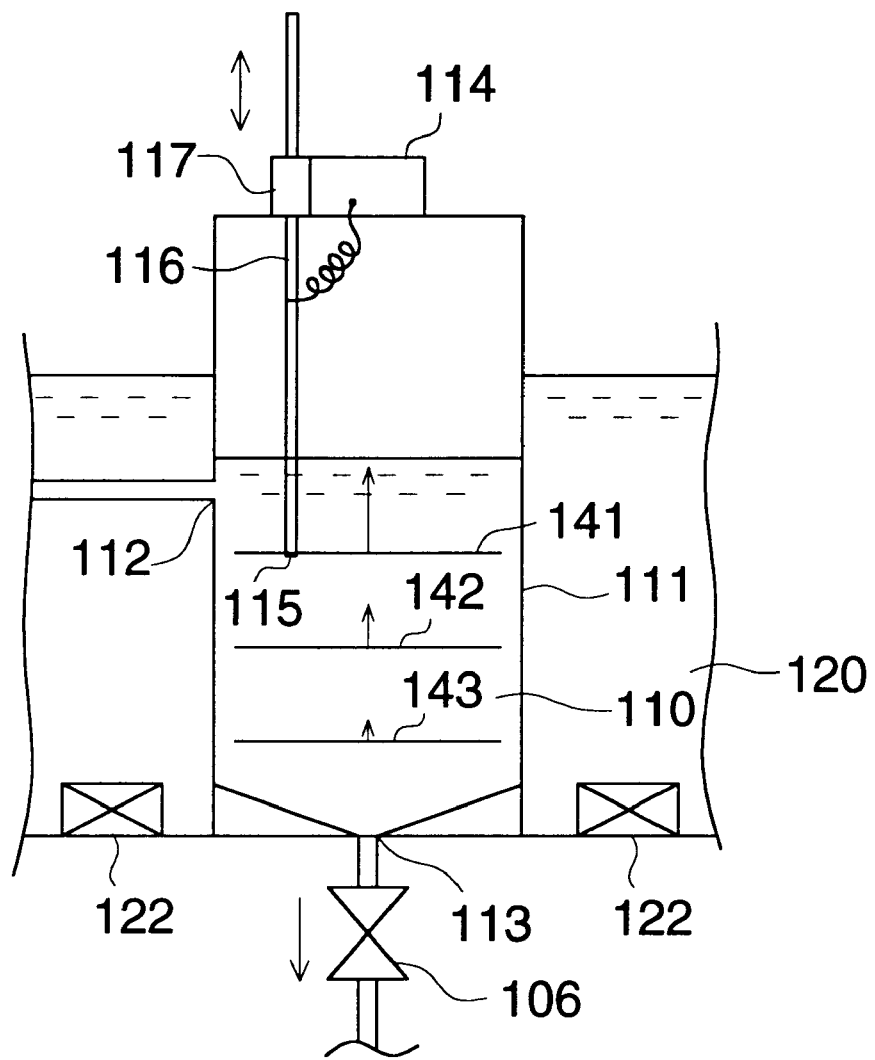
FIG. 10 is a schematic block cross sectional view showing movement of standing waves which occurs in the ultrasonic waves defoaming device in Embodiment 2.

In the present embodiment, as shown in FIG. 9(A), vibration frequency of two ultrasonic generators located at the bottom of ultrasonic waves transferring liquid container 121 which houses ultrasonic waves transferring liquid 120 in Embodiment 3 are, in the same manner, reduced in each cycle CY. Due to this, as shown in FIG. 9(B), the vibration waveslength of two ultrasonic waves generators increases within each cycle CY at a constant rate. As shown in FIG. 8, nodes 141, 142 and 143 of standing waves which occurs in the ultrasonic waves defoaming device of the present embodiment moves at a prescribed rate within each cycle CY. Accordingly, bubbles are moved to the liquid surface while they are trapped by nodes 141, 142 and 143 of standing waves. Defoaming effect is further enhanced. Incidentally, node 143, of the standing waves, which occurs at a position closed to ultrasonic waves generator 122 compared with node 141, of the standing waves, which occurs at a position separated from ultrasonic waves generator 122 moves at a lower rate compared with node 141. Due to this, a possibility that bubbles trapped by node 143 of the standing waves, which occurs at a position closed to liquid flowing outlet 113 is separated from the trap is decreased.

Embodiment 5

Figure 11:
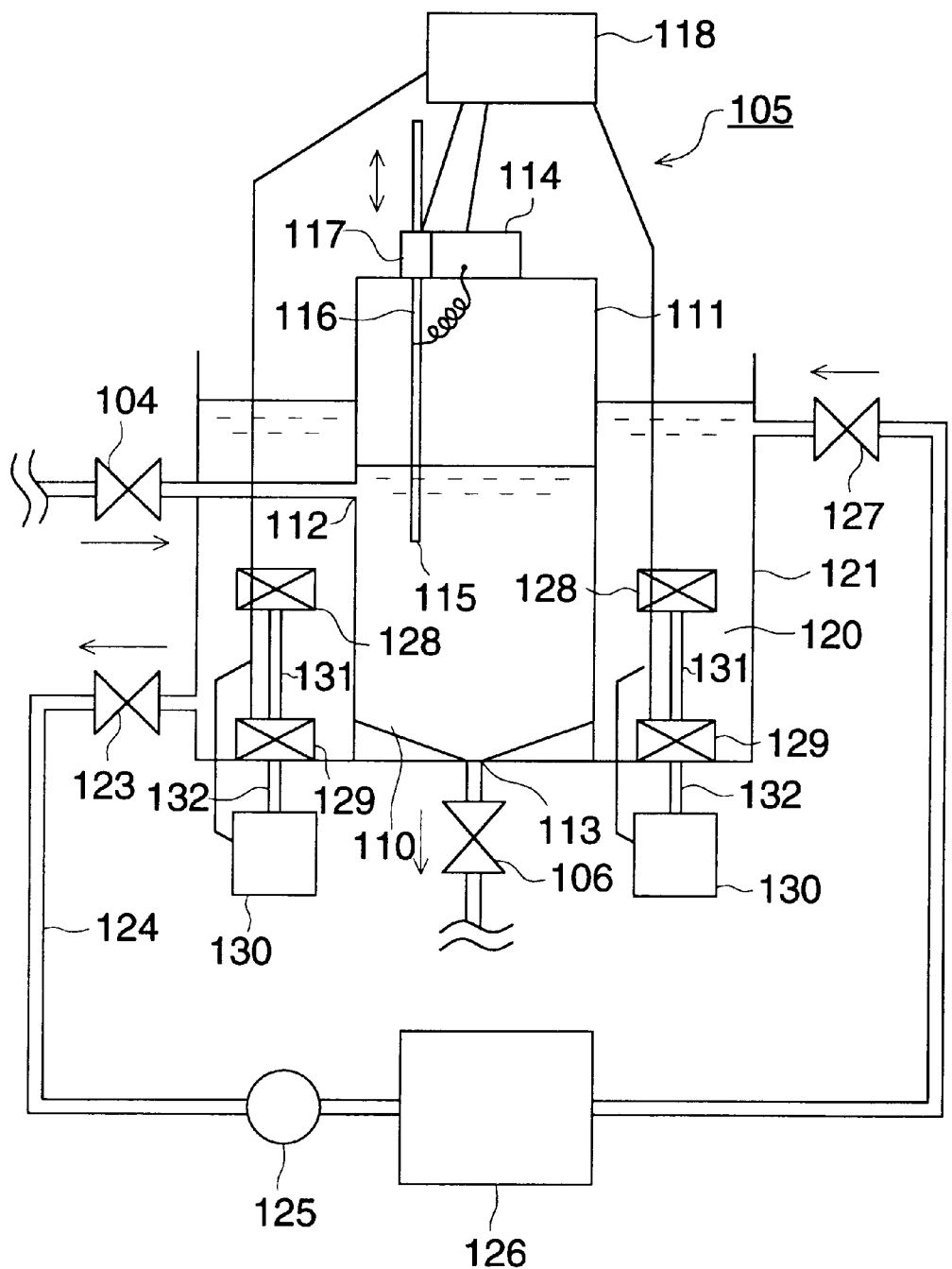
FIG. 11 is a schematic block cross sectional view showing the ultrasonic waves defoaming device in Embodiment 3.

The present embodiment is a varied embodiment of embodiment 3. All of where the present embodiment is different from embodiment 3 will be explained using FIG. 11 which shows schematic block cross sectional view of an ultrasonic defoaming device in Embodiment 5.

The present embodiment is provided with the first ultrasonic waves generators composed of two ultrasonic waves generators 128 and the second ultrasonic waves generators composed of two ultrasonic waves generators 129, in ultrasonic waves transferring liquid container 121. In ultrasonic waves transferring liquid container 121, ultrasonic waves generator vertically actuating section 130 which simultaneously vertically actuate two ultrasonic generators 128 belonging to the first ultrasonic waves generator group by vertically actuating retention member 131 which retains two ultrasonic waves generator 128 belonging to the first ultrasonic waves generator group and which simultaneously vertically actuate two ultrasonic generators 129 belonging to the second ultrasonic waves generator group by vertically actuating retention member 132 which retains two ultrasonic waves generator 129 belonging to the second ultrasonic waves generator group.

Control section 118 controls vibration of ultrasonic waves by each ultrasonic waves generators 128 and 129 and vertical movement of each ultrasonic waves generators 128 and 129 by the use of ultrasonic waves generator vertical driving section 130. By alternately moving the ultrasonic waves generator belonging to one ultrasonic waves generator group among two ultrasonic waves generator groups upward at a prescribed rate while aforesaid ultrasonic waves generator is outputted and moving the ultrasonic waves generator belonging to the other ultrasonic waves generator group among two ultrasonic waves generator groups downward at a prescribed rate while aforesaid ultrasonic waves generator is not outputted, ultrasonic waves transferring liquid 120 is defoamed while moving nodes of the standing waves in defoaming container 111 to the liquid surface direction.

Incidentally, in the present embodiment, all nodes of the standing waves move upward at a prescribed rate. When vibrating ultrasonic generator is changed from one ultrasonic waves generator group to the other ultrasonic waves generator group, the standing waves extinguishes momently, and then re-appears and all nodes of the standing waves move upward at a prescribed rate. Accordingly, bubbles are moved to the liquid surface while they are trapped by nodes 141, 142 and 143 of standing waves.

Embodiment 6

Figure 12:
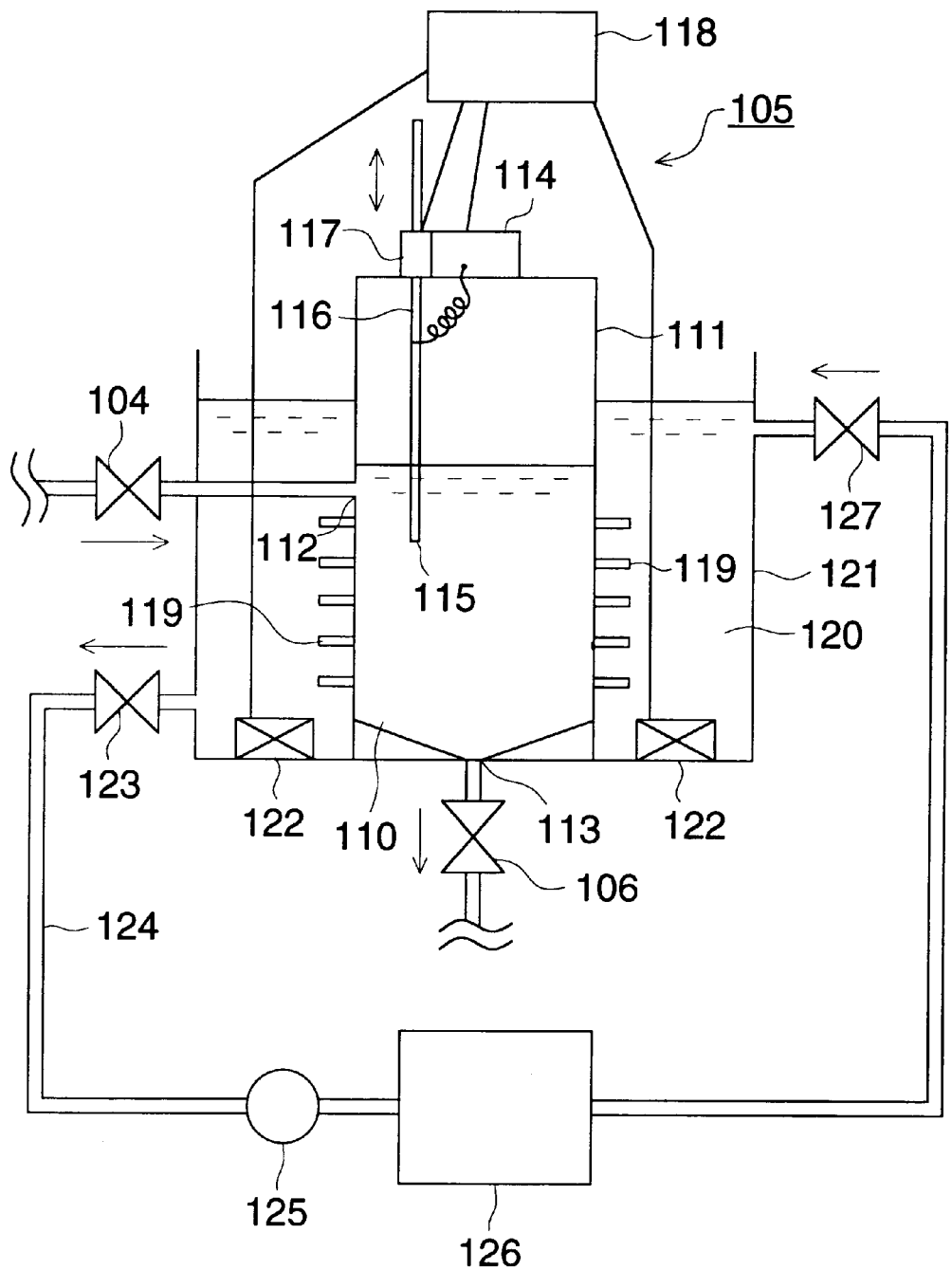
FIG. 12 is a schematic block cross sectional view showing the ultrasonic waves defoaming device in Embodiment 4.

The present embodiment is a varied embodiment of embodiment 3. All of where the present embodiment is different from embodiment 3 will be explained using FIG. 12 which shows a schematic block cross sectional view of an ultrasonic defoaming device in Embodiment 6.

In the present embodiment, on the side of ultrasonic waves transferring liquid 120 on defoaming container 111, plural donut-shaped disc fins 119 are provided. Due to this, complicated-formed standing waves occur multiply. Therefore, ability to trap bubbles is increased. Defoaming effect is further improved. Incidentally, provision of corrugation in place of fins 19 results in the same effect.

EXAMPLE 2

In ultrasonic waves generator shown in Embodiment 3 in which the frequency SF of the ultrasonic waves is 25 kHz and outputting is 500 W, while the actual difference $\Delta I$ [kgf/cm$^2$] of the strength of sound pressure between node and anti-node of the standing waves is varied, a 5% aqueous gelatin solution in which the degree of unsaturation of air AS is 50% and viscosity CV is 100 [cp] is flowed at flow rate FR of 1 [mm/sec] for evaluating defoaming result. Hereinafter, evaluation results are shown together with $\Delta I$ [kgf/cm$^2$] and condition value X represented by the following equation.

$$X = \Delta I * AS/(FR * CV * SF)$$

Evaluation results

| $\Delta I$ [kgf/cm$^2$] | X | Defoaming result |
|---|---|---|
| 0.10 | 0.0020 | B |
| 0.13 | 0.0026 | A |
| 0.20 | 0.0040 | A |
| 1.20 | 0.0240 | A |

Defoaming result
B: Defoaming is insufficient. Unless additional processing is provided, coating problems may occur in some cases.
A: Sufficient defoaming effect could be obtained.

EXAMPLES 3 through 5

Experiments were conducted in the same manner as in Example 2 except the device used in Example 2 was replaced with Embodiments 4 through 6. As a result, the same results were obtained.

Due to the present invention, defoaming effects are further improved even when high outputting ultrasonic waves generator is not used as conventionally been considered.

The disclosed embodiment can be varied by a skilled person without departing from the spirit and scope of the invention.

What is claimed is:

1. A method of defoaming liquid with ultrasonic wave in order to eliminate foam or bubble from the liquid, comprising steps of:
    storing liquid to be defoamed in a defoaming tank; and
    irradiating ultrasonic wave through ultrasonic wave transmitting liquid to the defoaming tank in which the liquid to be defoamed is stored;
wherein a degree of unsaturation of dissolved air in the ultrasonic wave transmitting liquid under defoaming operation is not lower than 10%.

2. The method of claim 1, wherein the ultrasonic wave transmitting liquid is deaerated such that the degree of unsaturation of dissolved air in the ultrasonic wave transmitting liquid under defoaming operation is not lower than 10%.

3. The method of claim 1, wherein the ultrasonic wave transmitting liquid is applied with pressure such that the degree of unsaturation of dissolved air in the ultrasonic wave transmitting liquid under defoaming operation is not lower than 10%.

4. The method of claim 1, wherein the liquid to be defoamed is irradiated with ultrasonic wave through the ultrasonic wave transmitting liquid while flowing from a liquid inlet to a liquid outlet in the defoaming tank, and the following conditional formula (1) is satisfied:

$$\Delta I \times AS/(FR \times CV \times SF) \geq 0.0026 \qquad (1)$$

wherein
  $\Delta I$ (Kgf/cm$^2$) is the difference in sound pressure between node and antinode of standing wave occurring in the liquid to be defoamed in the defoaming tank,
  FR (mm/sec.) is a flow speed of the liquid to be defoamed at the liquid outlet of the defoaming tank,
  CV (cp) is a viscosity of the liquid to be defoamed,
  SF (kHz) is a frequency of the ultrasonic wave, and
  AS (%) is an air unsaturation degree in the liquid to be defoamed in the defoaming tank.

5. The method of claim 4, wherein the defoaming is conducted under the condition that at least one piece of node surface of the standing wave resides between the liquid inlet and the liquid outlet in the defoaming tank.

6. The method of claim 4, wherein whether or not at least one piece of node surface of the standing wave resides between the liquid inlet and the liquid outlet in the defoaming tank is detected, and when at least one piece of node surface of the standing wave resides between the liquid inlet and the liquid outlet in the defoaming tank, the defoaming is conducted.

7. The method of claim 4, wherein sound pressure in the defoaming tank is measured and the ultrasonic oscillator is controlled so as to satisfy the conditional formula (1) in accordance with the sound pressure.

8. A method of producing a light sensitive material in order to eliminate foam or bubble from the liquid, comprising steps of:
    storing liquid to be coated onto the light sensitive material in a defoaming tank;
    irradiating ultrasonic wave through ultrasonic wave transmitting liquid to the defoaming tank in which the liquid is stored so that the liquid to be coated is defoamed; and
    coating the defoamed liquid onto a support of the light sensitive material;
wherein a degree of unsaturation of dissolved air in the ultrasonic wave transmitting liquid under defoaming operation is not lower than 10%.

9. The method of claim 8, wherein the liquid to be defoamed is irradiated with ultrasonic wave through the ultrasonic wave transmitting liquid while flowing from a liquid inlet to a liquid outlet in the defoaming tank, and the following conditional formula (1) is satisfied:

$$\Delta I \times AS/(FR \times CV \times SF) \geq 0.0026 \qquad (1)$$

wherein
  $\Delta I$ (Kgf/cm$^2$) is the difference in sound pressure between node and antinode of standing wave occurring in the liquid to be defoamed in the defoaming tank,
  FR (mm/sec.) is a flow speed of the liquid to be defoamed at the liquid outlet of the defoaming tank,
  CV (cp) is a viscosity of the liquid to be defoamed,
  SF (kHz) is a frequency of the ultrasonic wave, and
  AS (%) is an air unsaturation degree in the liquid to be defoamed in the defoaming tank.

10. An apparatus for defoaming liquid with ultrasonic wave in order to eliminate foam or bubble from the liquid comprising:

an ultrasonic wave liquid tank in which an ultrasonic wave transmitting liquid is stored;

a defoaming tank in which a liquid to be defoamed is stored, at least a part of the defoaming tank immersed in the ultrasonic wave transmitting liquid in the ultrasonic wave liquid tank;

a deaerating device to deaerate the ultrasonic wave transmitting liquid so as to make the degree of unsaturation of dissolved air in the ultrasonic wave transmitting liquid under defoaming operation not lower than 10%.

11. The apparatus of claim 10, wherein the defoaming tank is provided with a liquid inlet through which the liquid to be defoamed flows into the defoaming tank and a liquid outlet through which the liquid to be defoamed flows out from the defoaming tank, the liquid to be defoamed is irradiated with ultrasonic wave through the ultrasonic wave transmitting liquid while flowing from the liquid inlet to the liquid outlet in the defoaming tank, and the following conditional formula (1) is satisfied:

$$\Delta I \times AS/(FR \times CV \times SF) \geq 0.0026 \qquad (1)$$

wherein $\Delta I$ (Kgf/cm$^2$) is the difference in sound pressure between node and antinode of standing wave occurring in the liquid to be defoamed in the defoaming tank, FR (mm/sec.) is a flow speed of the liquid to be defoamed at the liquid outlet of the defoaming tank, Cv (cp) is a viscosity of the liquid to be defoamed, SF (kHz) is a frequency of the ultrasonic wave, and AS (%) is an air unsaturation degree in the liquid to be defoamed in the defoaming tank.

12. The apparatus of claim 11, further comprising sound pressure measuring means for measuring sound pressure in the defoaming tank, wherein the ultrasonic oscillator is controlled so as to satisfy the conditional formula (1) in accordance with the sound pressure measured by the sound pressure measuring means.

13. The apparatus of claim 12, wherein whether or not at least one piece of node surface of the standing wave resides between the liquid inlet and the liquid outlet in the defoaming tank is detected by the sound pressure measuring means, and when at least one piece of node surface of the standing wave resides between the liquid inlet and the liquid outlet in the defoaming tank, the defoaming is conducted.

14. The apparatus of claim 10, wherein the liquid to be defoamed is irradiated with ultrasonic wave through the ultrasonic wave transmitting liquid while flowing in a flow direction from a liquid inlet to a liquid outlet in the defoaming tank, and a plurality of the ultrasonic oscillators are arranged opposite to each other across the center of the defoaming tank and the oscillating surface of each ultrasonic oscillator is located perpendicular to the flow direction.

15. The apparatus of claim 10, wherein the liquid to be defoamed is irradiated with ultrasonic wave through the ultrasonic wave transmitting liquid while flowing from a liquid inlet to a liquid outlet in the defoaming tank, and an ultrasonic wave transmitting liquid side of the defoaming tank is provided with plural fins or plural protrusions.

16. The apparatus of claim 10, wherein the liquid to be defoamed is irradiated with ultrasonic wave through the ultrasonic wave transmitting liquid while flowing from a liquid inlet to a liquid outlet in the defoaming tank, the liquid outlet is located at the bottom of the defoaming tank or in the vicinity of the bottom, and the defoaming is conducted while the node of the standing wave is shifted toward the liquid surface of the liquid to be defoamed in the defoaming tank.

17. The apparatus of claim 16, wherein at least two groups of the ultrasonic oscillators each group comprising at least a pair of the ultrasonic oscillators are provided in the ultrasonic wave liquid tank, and wherein alternate oscillating operation is conducted such that one of the two groups of the ultrasonic oscillators is shifted while irradiating ultrasonic wave and the other one does not irradiate ultrasonic wave, thereafter the one of the two groups of the ultrasonic oscillators does not irradiate ultrasonic wave and the other one is shifted while irradiating ultrasonic wave, whereby the defoaming is conducted while the node of the standing wave is shifted toward the liquid surface in the defoaming tank.

18. The apparatus of claim 16, wherein the frequency of the ultrasonic oscillator is modulated such that the node of the standing wave is shifted toward the liquid surface in the defoaming tank.

19. An apparatus for defoaming liquid with ultrasonic wave in order to eliminate foam or bubble from the liquid comprising:

an ultrasonic wave liquid tank in which an ultrasonic wave transmitting liquid is stored;

a defoaming tank in which a liquid to be defoamed is stored, at least a part of the defoaming tank immersed in the ultrasonic wave transmitting liquid in the ultrasonic wave liquid tank;

an ultrasonic oscillator for irradiating ultrasonic wave through the ultrasonic wave transmitting liquid to the defoaming tank; and a pressing device to apply pressure to the ultrasonic wave transmitting liquid so as to make the degree of unsaturation of dissolved air in the ultrasonic wave transmitting liquid under defoaming operation not lower than 10%.

20. The apparatus of claim 19 wherein the defoaming tank is provided with a liquid inlet through which the liquid to be defoamed flows into the defoaming tank and a liquid outlet through which the liquid to be defoamed flows out from the defoaming tank, the liquid to be defoamed is irradiated with ultrasonic wave through the ultrasonic wave transmitting liquid while flowing from the liquid inlet to the liquid outlet in the defoaming tank, and the following conditional formula (1) is satisfied:

$$\Delta I \times AS (FR \times CV \times SF) \geq 0.0026 \qquad (1)$$

wherein $\Delta I$ (Kgf/cm$^2$) is the difference in sound pressure between node and antinode of standing wave occurring in the liquid to be defoamed in the defoaming tank, FR (mm/sec) is a flow of the liquid to be defoamed at the liquid outlet of the defoaming tank, CV (cp) is a viscosity of the liquid to be defoamed, SF (kHz) is a frequency of the ultrasonic wave, and AS (%) is an air unsaturation degree in the liquid to be defoamed in the defoaming tank.

21. The apparatus of claim 20 further comprising sound pressure measuring means for measuring sound pressure in the defoaming tank wherein the ultrasonic oscillator is controlled so as to satisfy the conditional formula (1) in accordance with the sound pressure measured by the sound pressure measuring means.

22. The apparatus of claim 21 wherein whether or not at least one piece of node surface of the standing wave resides between the liquid inlet and the liquid outlet in the defoaming tank is detected by the sound pressure measuring means, and when at least one piece of node surface of the standing wave resides between the liquid inlet and the liquid outlet in the defoaming tank, the defoaming is conducted.

23. The apparatus of claim 19 wherein the liquid to be defoamed is irradiated with ultrasonic wave through the ultrasonic wave transmitting liquid while flowing in a flow direction from a liquid inlet to a liquid outlet in the defoaming tank, and a plurality of the ultrasonic oscillators are arranged opposite to each other across the center of the defoaming tank and the oscillating surface of each ultrasonic oscillator is located perpendicular to the flow direction.

24. The apparatus of claim 19 wherein the liquid to be defoamed is irradiated with ultrasonic wave through the ultrasonic wave transmitting liquid while flowing from a liquid inlet to a liquid outlet in the defoaming tank, and an ultrasonic wave transmitting liquid side of the defoaming tank is provided with plural fins or plural protrusions.

25. The apparatus of claim 19 wherein the liquid to be defoamed is irradiated with ultrasonic wave through the ultrasonic wave transmitting liquid while flowing from a liquid inlet to a liquid outlet in the defoaming tank, the liquid outlet is located at the bottom of the defoaming tank or in the vicinity of the bottom, and the defoaming is conducted while the node of the standing wave is shifted toward the liquid surface of the liquid to be defoamed in the defoaming tank.

26. The apparatus of claim 25 wherein at least two groups of ultrasonic oscillators each group comprising at least a pair of the ultrasonic oscillators are provided in the ultrasonic wave liquid tank, and wherein alternate oscillating operation is conducted such that one of the two groups of the ultrasonic oscillators is shifted while irradiating ultrasonic wave and the other one does not irradiate ultrasonic wave, thereafter the one of the two groups of the ultrasonic oscillators does not irradiate ultrasonic wave and the other one is shifted while irradiating ultrasonic wave, whereby the defoaming is conducted while the node of the standing wave is shifted toward the liquid surface in the defoaming tank.

27. The apparatus of claim 25 wherein the frequency of the ultrasonic oscillator is modulated such that the node of the standing wave is shifted toward the liquid surface in the defoaming tank.

* * * * *